US010044442B2

(12) United States Patent
Yogeeswaran et al.

(10) Patent No.: US 10,044,442 B2
(45) Date of Patent: Aug. 7, 2018

(54) QUASI-WIRELESS COMMUNICATION SYSTEM

(71) Applicant: Google Inc., Mountain View, CA (US)

(72) Inventors: Karthik Yogeeswaran, Mountain View, CA (US); Peter Gelbman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/411,740

(22) Filed: Jan. 20, 2017

(65) Prior Publication Data

US 2017/0237497 A1 Aug. 17, 2017

Related U.S. Application Data

(60) Provisional application No. 62/293,927, filed on Feb. 11, 2016.

(51) Int. Cl.
*H04B 1/40* (2015.01)
*H04B 10/40* (2013.01)
*H04B 3/54* (2006.01)
*H04B 10/27* (2013.01)

(52) U.S. Cl.
CPC ............... *H04B 10/40* (2013.01); *H04B 1/40* (2013.01); *H04B 3/542* (2013.01); *H04B 10/27* (2013.01)

(58) Field of Classification Search
CPC .......... H04B 10/25753; H04B 10/1125; H04B 10/25752; H04B 10/25759; H04B 10/40; H04B 1/40; H04B 10/27; H04B 3/542; H04W 88/085
See application file for complete search history.

(56) References Cited

U.S. PATENT DOCUMENTS

| 8,159,385 | B2 | 4/2012 | Farneth |
| 2004/0169572 | A1 | 9/2004 | Elmore |
| 2005/0017825 | A1 | 1/2005 | Hansen |
| 2011/0187578 | A1* | 8/2011 | Farneth ................. G01S 13/04 342/27 |

(Continued)

FOREIGN PATENT DOCUMENTS

CA 2515560 A1 2/2007

OTHER PUBLICATIONS

International Search Report and Written Opinion for related Application No. PCT/US2017/014413 dated Apr. 18, 2017.

*Primary Examiner* — Ted Wang
(74) *Attorney, Agent, or Firm* — Honigman Miller Schwartz and Cohn LLP

(57) ABSTRACT

A method for delivering a communication signal is disclosed. The method includes receiving, at an optical transceiver, an optical communication and constructing, at a baseband integrated circuit in communication with the optical transceiver, a radio frequency communication (e.g., the intermediate frequency data and control signals) based on the optical communication. The method also includes transmitting the radio frequency communication from a Sommerfeld-Goubau launcher in communication with the baseband integrated circuit as a surface wave along a power line to a strand mount device disposed on the power line. The strand mount device is configured to receive the radio frequency communication and wirelessly transmit the radio frequency communication (e.g., via a wireless link) to a user device.

24 Claims, 33 Drawing Sheets

(56) References Cited

U.S. PATENT DOCUMENTS

2014/0155054 A1    6/2014   Henry et al.
2015/0035704 A1*  2/2015   Schwengler ......... H01Q 1/2291
                                                       343/702

* cited by examiner

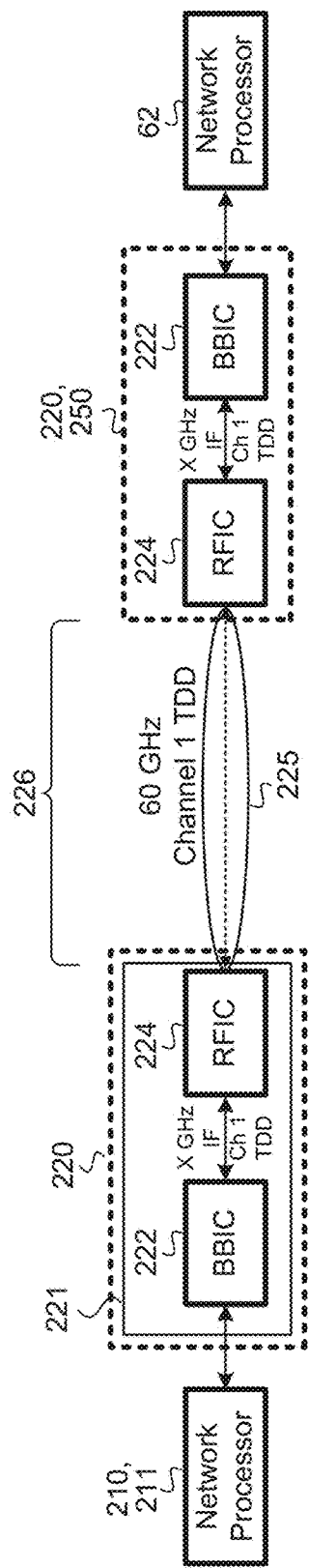

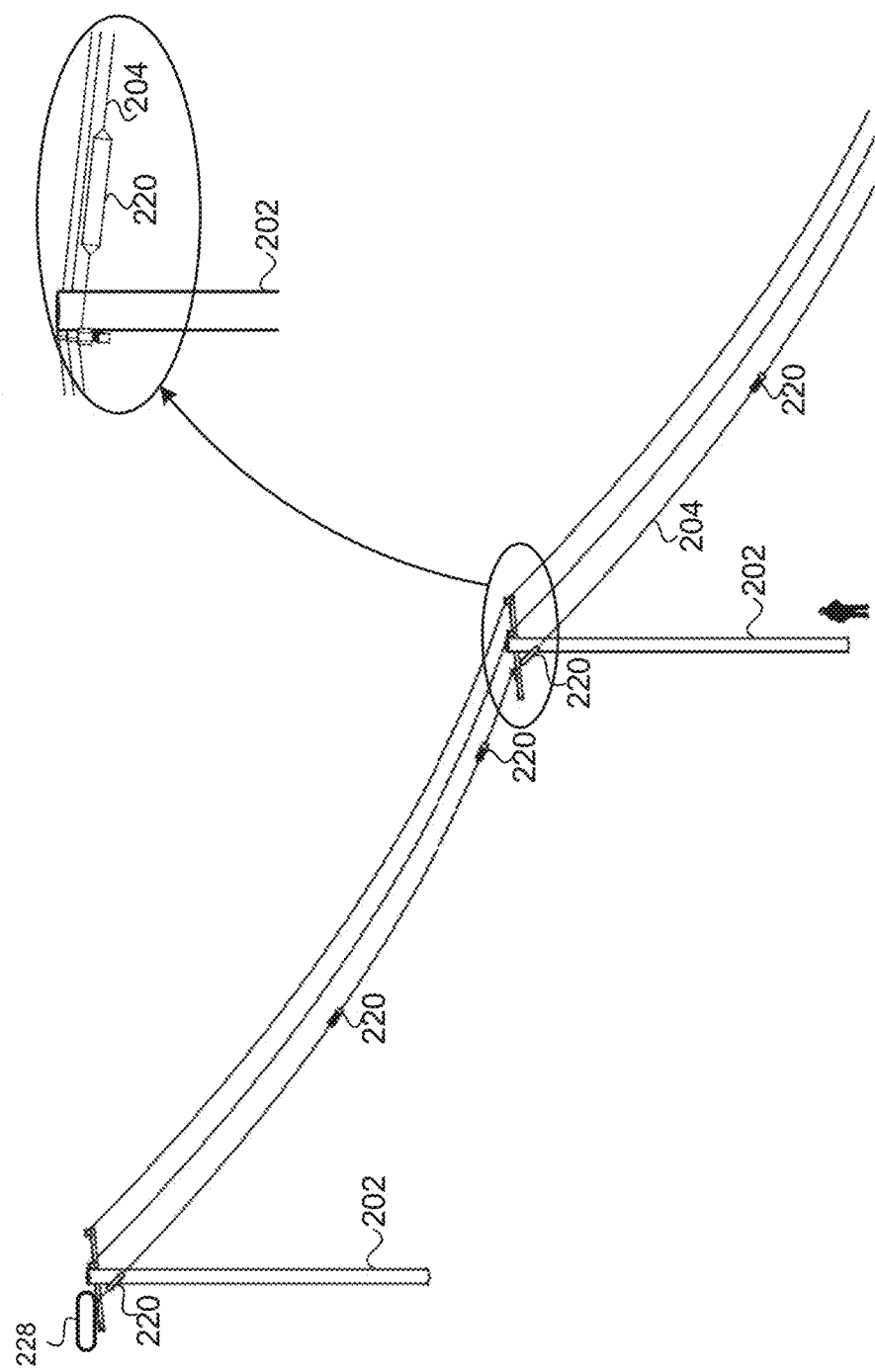

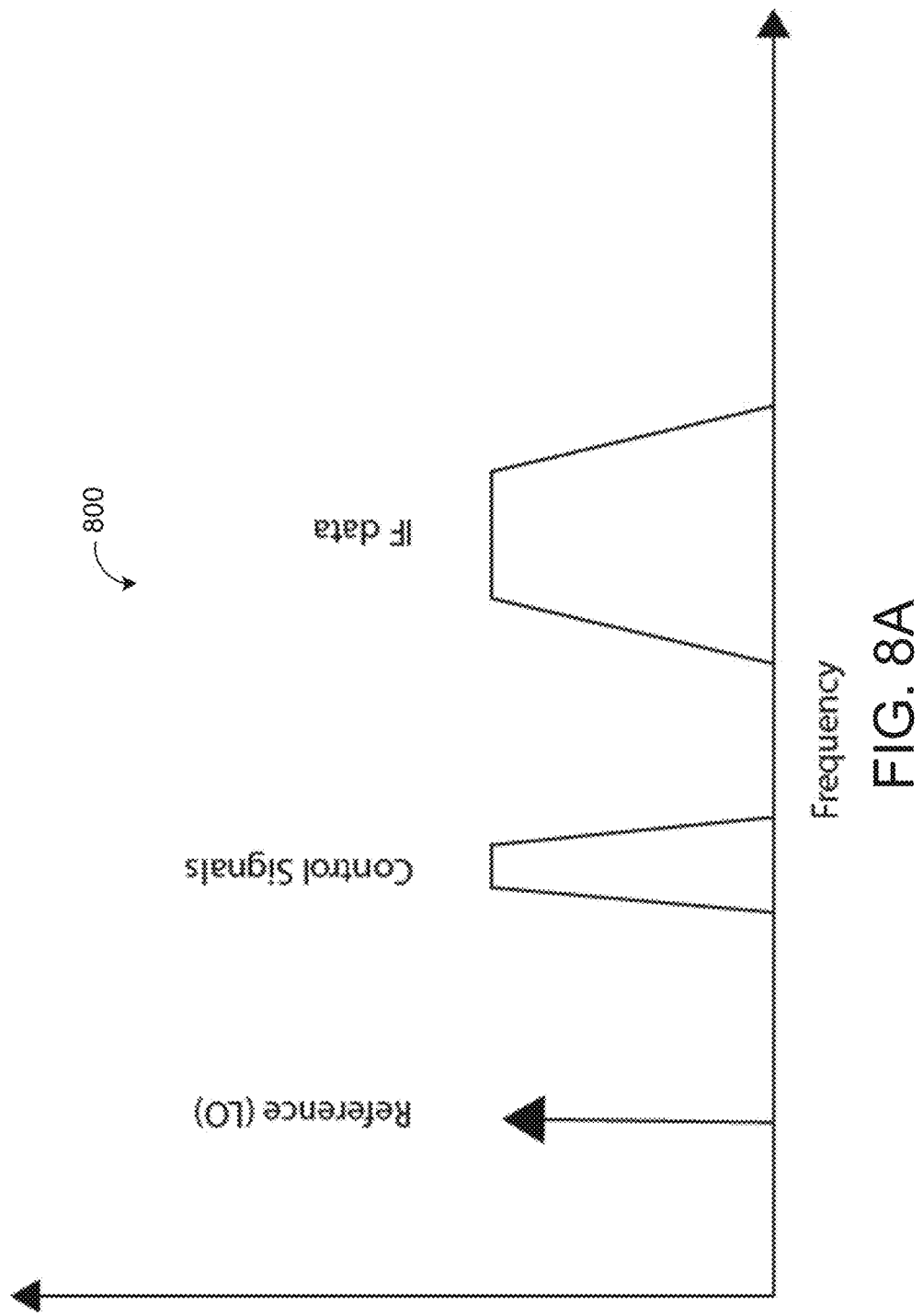

QUASI-WIRELESS COMMUNICATION SYSTEM

CROSS REFERENCE TO RELATED APPLICATIONS

This U.S. patent application claims priority under 35 U.S.C. § 119(e) to U.S. Provisional Application 62/293,927, filed on Feb. 11, 2016, which is hereby incorporated by reference in its entirety.

TECHNICAL FIELD

This disclosure relates to communication systems that use an existing power line infrastructure.

BACKGROUND

A basic communication system generally includes a transmitter that converts a message to an electrical form suitable to be transferred over a communication channel. The communication channel transfers the message from the transmitter to the receiver. The receiver receives the message and converts it back to its original form.

Fiber optic communication is an emerging method of transmitting information from a source (transmitter) to a destination (receiver) using optical fibers as the communication channel, or using a combination of optical fibers and other communication channels. Optical fibers are flexible, transparent fibers made of thin glass silica or plastic that transmits light throughout the length of the fiber between the source and the destination. Fiber optic communications allow for the transmission of data over longer distances at a bandwidth higher than other known forms of communications. Fiber optics are an improved form of communication over metal wires because the light traveled through the fiber experiences less loss and is immune to electromagnetic interference. Companies use optical fibers to transmit telephone signals, internet communication, and cable television signals.

Fiber-to-the-home (FTTH) is generally the installation and use of optical fibers from a central point directly to individual buildings, such as residences, apartment buildings, and businesses to provide high-speed internet access. Implementing FTTH communication networks on a large scale requires installation of optical fibers from the central point to the individual buildings. The last stage of constructing the FTTH communication network is connecting a fiber drop to a small box known as a Network Interface Unit (NIU) on the outside of a building. The fiber drop box includes a fiber cable connecting the fiber cables from the existing network to a network interface controller (NIC). Therefore, the FTTH communication network may be costly due to the price of optical fibers and the amount of optical fibers needed to reach each building.

SUMMARY

One aspect of the disclosure provides a method for delivering a communication signal. The method includes receiving, at an optical transceiver, an optical communication and constructing, at a baseband integrated circuit in communication with the optical transceiver, a radio frequency communication (e.g., the intermediate frequency data and control signals) based on the optical communication. The method also includes transmitting the radio frequency communication from a Sommerfeld-Goubau launcher in communication with the baseband integrated circuit as a surface wave along a power line to a strand mount device disposed on the power line. The strand mount device is configured to receive the radio frequency communication and wirelessly transmit the radio frequency communication (e.g., via a wireless link) to a user device.

Implementations of the disclosure may include one or more of the following optional features. In some implementations, the method includes processing the optical communication at a network processor in communication with the optical transceiver and the baseband integrated circuit. The step of constructing the radio frequency communication may include constructing intermediate frequency data for a wireless link and control signals for controlling at least one radio frequency integrated circuit of the strand mount device. In some implementations, transmitting the radio frequency communication as the surface wave along the power line to the strand mount device includes transmitting the radio frequency communication from the Sommerfeld-Goubau launcher to a Sommerfeld-Goubau catcher of the strand mount device. The Sommerfeld-Goubau launcher and the Sommerfeld-Goubau catcher may include a frustoconical shell defining a longitudinal axis and first and second openings along the longitudinal axis. The first opening may be smaller than the second opening, wherein the power line passes through the first opening and the second opening and along the longitudinal axis, the first opening is coupled to the power line. The power line may include a single conductor acting as a Sommerfeld-Goubau line for conveyance of the surface wave. The strand mount device may be configured to wirelessly transmit the radio frequency communication in accordance with an IEEE 802.11ad protocol to the user device. The user device may be located within a near line-of-sight of the strand mount device.

Another aspect of the disclosure provides a strand mount device. The strand mount device includes a Sommerfeld-Goubau catcher and a Sommerfeld-Goubau launcher. The Sommerfeld-Goubau catcher is configured to attach to a power line and to receive a radio frequency communication (e.g., intermediate frequency data and control signals) propagated as a surface wave along a first portion of the power line. The Sommerfeld-Goubau launcher is configured to attach to the power line and to transmit the received radio frequency communication as the surface wave along a second portion of the power line. At least one radio frequency integrated circuit is in communication with the Sommerfeld-Goubau catcher and the Sommerfeld-Goubau launcher. The at least one radio frequency integrated circuit is configured to receive the radio frequency communication and wirelessly transmit the radio frequency communication to a user device.

This aspect may include one or more of the following optional features. In some implementations, the radio frequency communication includes intermediate frequency data for a wireless link and control signals for controlling the at least one radio frequency integrated circuit. The strand mount device may include a housing configured to mount on the power line and house the Sommerfeld-Goubau catcher, the Sommerfeld-Goubau launcher, and the at least one radio frequency integrated circuit. The strand mount device may also include an amplifier in communication with the Sommerfeld-Goubau launcher and configured to amplify the radio frequency communication. The strand mount device may further include a frequency shifter in communication with the Sommerfeld-Goubau launcher. The frequency shifter may be configured to shift a frequency of the received radio frequency wave (e.g., the intermediate frequency data and the control signals) to satisfy a passband frequency of the Sommerfeld-Goubau launcher. In some examples, the strand mount device includes a current transformer or an energy harvesting device electrically connected to the at least one radio frequency integrated circuit and configured to inductively tap from the power line and supply the tapped power to the at least one radio frequency integrated circuit. The strand mount device may include utility monitoring hardware in communication with the energy harvesting device. The utility monitoring hardware is configured to receive a power signal from the energy harvesting device and transmit utility monitoring data to a network operations center (NOC) in communication with the strand mount device (e.g., to notify the NOC of any issues with the power line).

Yet another aspect of the disclosure provides a network node including an optical transceiver configured to receive an optical communication, a baseband integrated circuit in communication with the optical transceiver, and a Sommerfeld-Goubau launcher. The baseband integrated circuit is configured to construct a radio frequency communication (e.g., intermediate frequency data for a wireless link and control signals for controlling the at least one radio frequency integrated circuit of a strand mount device) based on the optical communication. The Sommerfeld-Goubau launcher is in communication with the baseband integrated circuit and configured to couple to a power line. The Sommerfeld-Goubau launcher is configured to propagate the radio frequency communication as a surface wave along the power line (e.g., to the strand mount device).

This aspect may include one or more of the following optional features. In some implementations, the strand network node includes a network processor in communication with the optical transceiver and the baseband integrated circuit. The network processor is configured to process the optical communication (e.g., for managing data packet delivery from a source to a destination). The Sommerfeld-Goubau launcher may include a frustoconical shell defining a longitudinal axis and first and second openings along the longitudinal axis. In some examples, the first opening is smaller than the second opening. The power line may pass through the first opening and the second opening and along the longitudinal axis, the first opening configured to be coupled to the power line. The baseband integrated circuit may be configured to manage communication of the radio frequency communication. The network node may also include a housing configured to attach to a power line and house the baseband integrated circuit and the Sommerfeld-Goubau launcher.

Yet another aspect of the disclosure provides a second method for operating an antenna distribution system. This method includes receiving, at a Sommerfeld-Goubau catcher, a radio frequency communication (e.g., an intermediate frequency communication) propagated as a surface wave along a portion of a power line and wirelessly transmitting the radio frequency communication from a radio frequency integrated circuit to a user device. The power line acts as a Sommerfeld-Goubau line. The radio frequency integrated circuit is located within near line-of-sight of the user device.

This aspect may include one or more of the following optional features. The method may include transmitting the radio frequency communication from a Sommerfeld-Goubau launcher as the surface wave along another portion of the power line. The radio frequency integrated circuit may be configured to transmit the radio frequency communication in accordance with an IEEE 802.11ad protocol.

In some examples, the Sommerfeld-Goubau launcher and the Sommerfeld-Goubau catcher each include a substantially frustoconical shell defining a longitudinal axis and first and second openings along the longitudinal axis. In these examples, the first opening is smaller than the second opening and the power line passes through the first opening and the second opening along the longitudinal axis, with the first opening coupled to the power line. Additionally, the power line may include a single conductor acting as the Sommerfeld-Goubau line for conveyance of the surface wave.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4A-4D are schematic views of example wireless configurations, line of sight configurations, and power configurations.

FIGS. 6A-6C are schematic views of example communication networks using BBIC/RFIC communication links.

FIG. 8A is a schematic view of an example signal between a BBIC and an RFIC communicating over a communication link.

Like reference symbols in the various drawings indicate like elements.

DETAILED DESCRIPTION

Access Network Overview

Figure 1A:
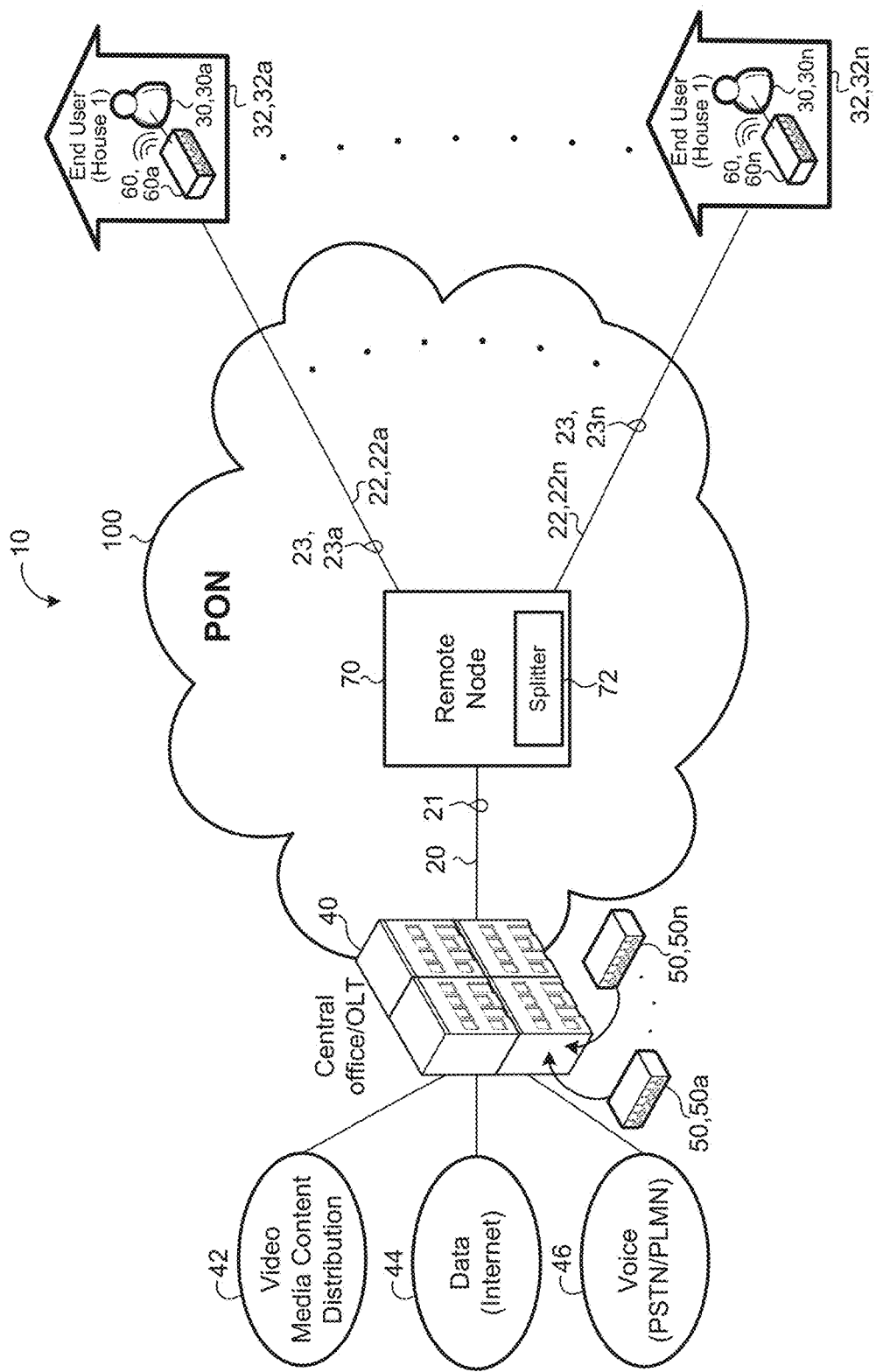
FIGS. 1A and 1B are schematic views of example access networks.
Figure 1B:
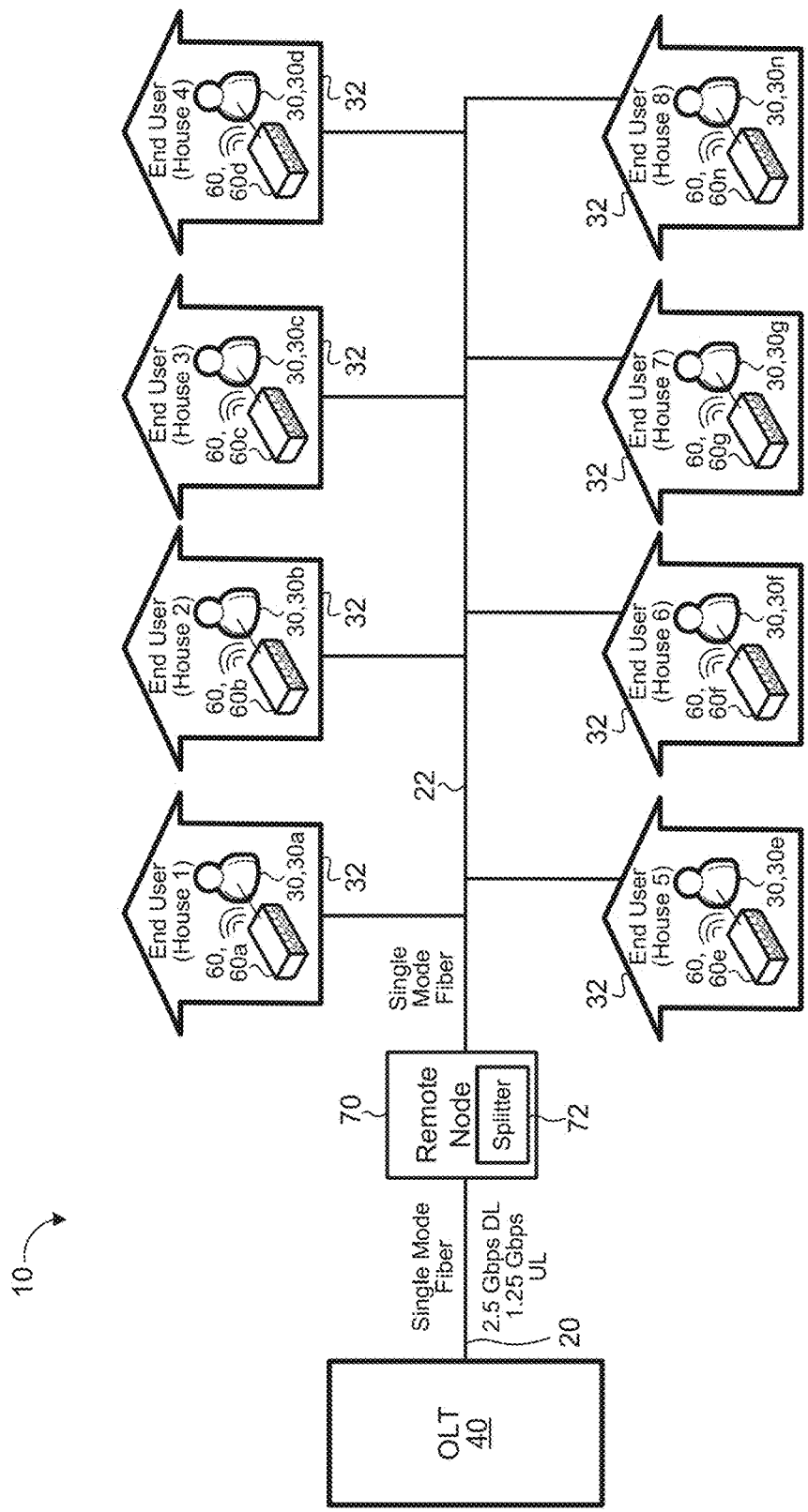

Referring to FIGS. 1A and 1B, an access network 10 connects users 30 to a service provider. In some implementations, the access network 10 includes a fiber-to-the-building (FTTB) system. FTTB is the delivery of a communication signal 21 through optical fibers 20, 22 from a central office (CO) 40 or optical line terminal (OLT) 50 to a building 32, such as a home or a business of a user. FTTB systems are generally offered through point-to-multi-point time division multiplexed (TDM) passive optical networks 100 (PONs) using a passive optical power splitter at a remote node 70 (RN) in the field to share a common transceiver 50 (e.g., OLT) at the CO 40, or through point-to-point (pt-2-pt) optical Ethernets (not shown), where a home-run fiber extends all the way back to the CO 40, and each one is terminated by a separate transceiver wavelength division multiplexed (WDM) as opposed to the shared transceiver 50 (TDM) as shown. The PON 100 is a point-to-multipoint network architecture that uses optical power splitters (at the remote node) to enable a single optical feed fiber 20 to serve multiple building 32 associated with the users 30a-30n (e.g. 16-128). The PON 100 provides optical signals from the CO 40 and includes an optical transmitter/receiver or transceiver 50 to a number of optical network terminals (ONTs) also known as an NIU that each includes a bidirectional optical transceiver.

Compared to pt-2-pt home run systems, a TDM-PON provides beneficial savings in the number of feeder fibers 20 (between a remote node 70 and the central office 40), and in the number of optical transceivers 50 at the CO 40 while saving patch panel space to terminate fibers 22.

The CO 40 receives information, such as video media distribution 42, internet data 44, and voice data 46 that may be transferred to the end users 30. The CO 40 includes an optical line terminal (OLT) 50 connecting the optical access network to an internet protocol (IP), asynchronous transfer mode (ATM), or synchronous optical networking (SONET) backbone, for example. Therefore, the OLT 50 is the endpoint of the PON 100 and converts the electrical signals used by a service provider's equipment and the fiber optic signals used by the PON 100. In addition, the OLT 50 coordinates multiplexing between the conversion devices at the user end 30. The OLT 50 sends the fiber optic signal through a feeder fiber 20, and the signal is received by a remote node 70, which demultiplexes the signal and distributes it to multiple users 30 via terminate fibers 22. In some examples, each CO 40 includes multiple OLTs 50, 50a-n. Each OLT 50 is configured to provide a signal to a group of users 30. In addition, each OLT 50 may be configured to provide signals or services that are in different services, e.g., one OLT provides services in G-PON and another provides services in XG-PON. When the CO 40 includes more than one OLT 50, the signals of each OLT 50 may be multiplexed before sending them to the remote node 70.

Multiplexing enables several virtual channels to be formed on a single fiber 20, 22. Therefore, multiplexing several optical signals increases the utility of a network infrastructure. Time division multiplexing (TDM) is a method used to multiplex several signals onto one high-speed digital fiber optic link. TDM multiplexes several signals by establishing different virtual channels using different time slots. Wavelength division multiplexing (WDM) multiplexes the signals by having different virtual channels use different wavelengths. A multiplexer (MUX) combines several input signals and outputs a combined signal of the separate signals. The multiplexed signal is transmitted through a physical wire, e.g., single optical fiber 20, 22, which saves the cost of having multiple wires for each signal.

As shown in FIGS. 1A and 1B, the CO 40 receives signals from several sources, such as video media distribution 42, internet data 44, and voice data 46, and multiplexes the received signals into one multiplexed signal 21 before sending the multiplexed signal 21 to the remote node 70 through the feeder fiber 20. In addition, the CO 40 multiplexes the signals of each OLT 50 before sending the multiplexed signal 21 to the remote node 70 through the feeder fiber 20. The CO 40 includes a carrier source (e.g., a laser diode or a light emitting diode) for generating an optical signal that carries the multiplexed signal 21 to the end user 30.

At the receiver end, i.e., the ONU 60 at the user end, a reverse process occurs using a demultiplexer (DEMUX). The demultiplexer receives the multiplexed signal 21 and divides it into the separate original signals 23, 23a-n that were originally combined. In some examples, a photodetector converts the optical wave back into its electric form and is located at the remote node or at the end user 30 (e.g., data over a network, sound waves converted into currents using microphones and back to its original physical form using speakers, converting images converted into currents using video cameras and converting back to its physical form using a television).

The transceiver or ONU 60 at the user end includes a carrier source (e.g., laser diode or light-emitting diode) for generating an optical signal that carries the information to be sent from an end user 30 to the CO 40. A laser is a high-frequency generator or oscillator, which requires amplification, feedback, and a tuning mechanism that determines the frequency. Lasers emit light coherently such that the laser output is a narrow beam of light. In some implementations, a laser includes a medium that provides the amplification and the frequency, and mirrors that provide the feedback. Photons bounce off one mirror through the medium and head back to another mirror to bounce back for further amplification. One, and sometimes both mirrors, may partially transmit light to allow a fraction of the generated light to be emitted. A laser diode is an electrically pumped semiconductor laser having an active medium being a p-n junction. The p-n junction is created by doping (i.e., introduction of impurities into a pure semiconductor to change its electrical properties). In the example shown, one feeder fiber 20 is employed from the CO 40 to a remote node 70, where the signal 21 is split by a splitter 72 and distributed (as split signals 23, 23a-n) to, for example, ONUS 60a-60n.

FTTB systems may be costly due to the amount of optical fibers 22 needed to reach each building 32. In addition, designing an infrastructure for optical fibers 20, 22 to reach each building requires planning time and implementation time.

Quasi-Wireless Edge Network

Figure 2A:
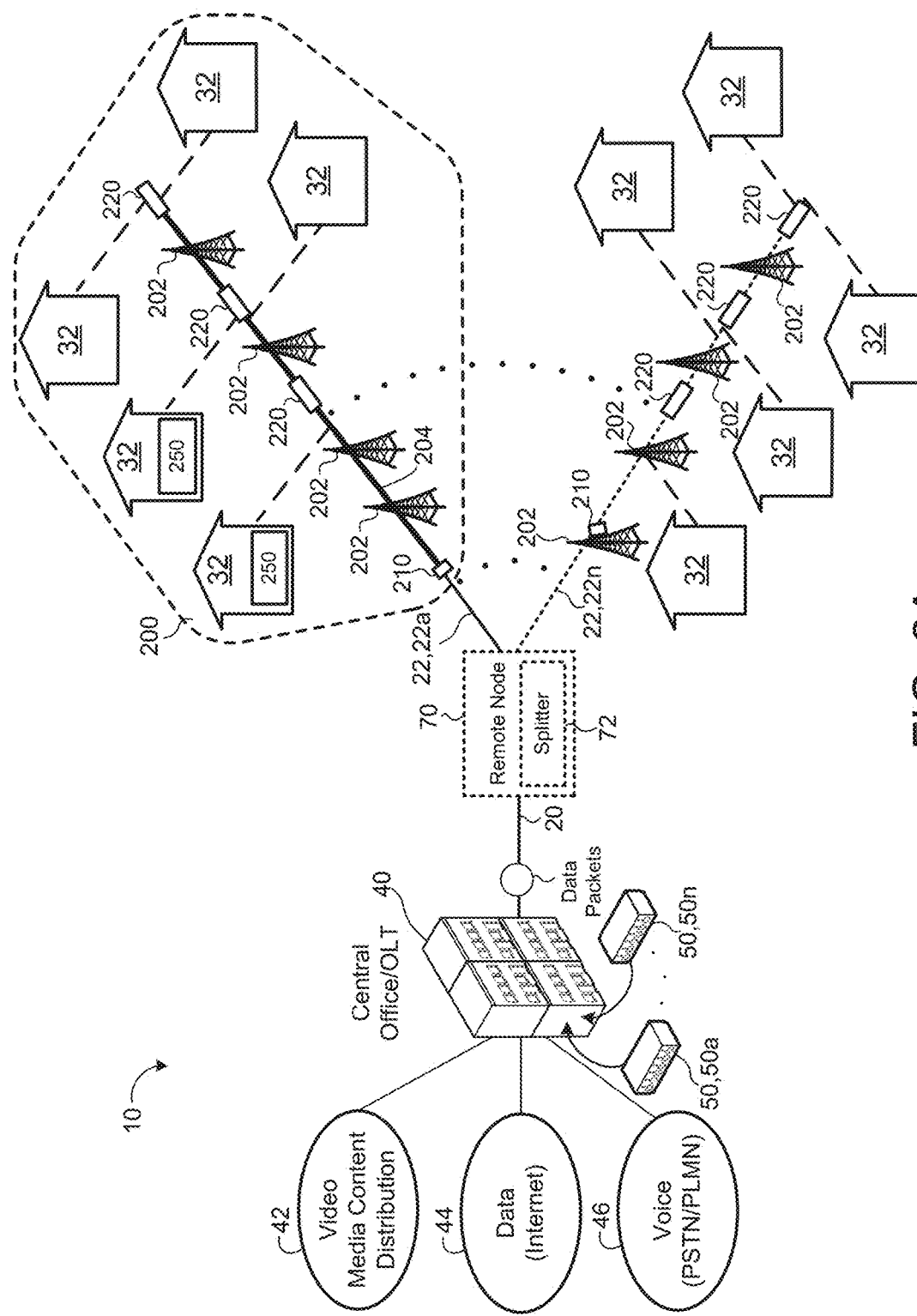
FIGS. 2A and 2B are schematic views of another example access network that includes a quasi-wireless edge network.
Figure 2B:
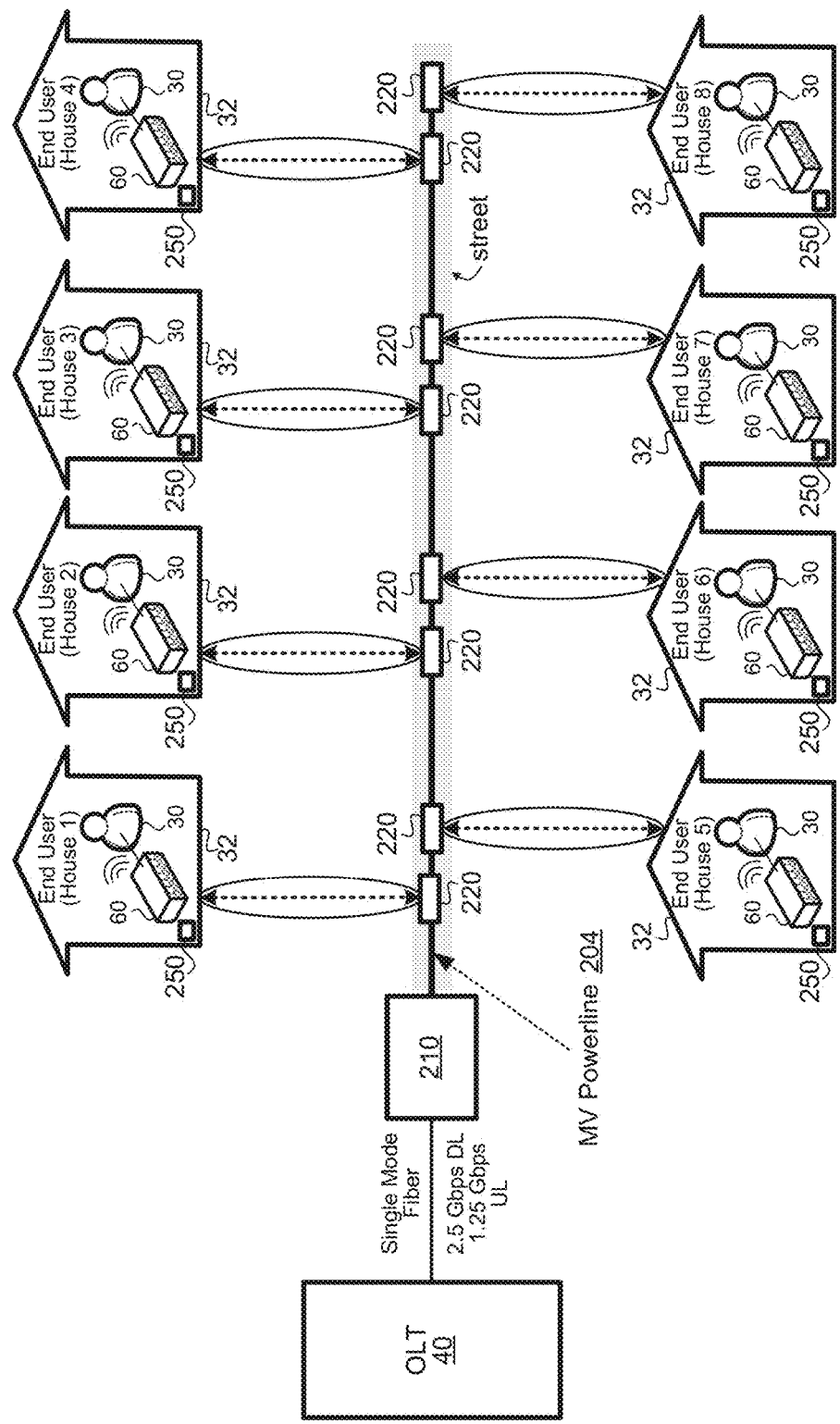

Referring to FIGS. 2A and 2B, in some implementations, the access network 10 includes a quasi-wireless edge network 200 that replaces the last section of access fiber and the fiber drop reaching an ONU 60 (e.g., placed outside the wall of each building 32) or a network interface controller (NIC) (not shown). The quasi-wireless edge network 200 is cost and implementation-time effective, while providing users 30 with fiber internet connections and without compromising capacity for the users 30. The quasi-wireless edge network 200 uses a combination of surface waves and mm-wave radios to provide the last section of network access.

In the example shown, the quasi-wireless edge network 200 includes a medium voltage (MV) power line 204, a network device 210 in communication with the MV power line 204 and the OLT 50, strand mount devices 220 disposed on the MV power line 204, and in-house user devices 250 in wireless communication with the strand mount devices 220. In some implementations, the strand mount device 220 includes a Sommerfeld-Goubau launcher pair 300, 300a, 300b (FIG. 3A) in communication with an 802.11ad radio. The Sommerfeld-Goubau launcher pair transmits/receives radio waves above 1 GHz along the MV power line 204, which acts as a Sommerfeld-Goubau line. Therefore, the quasi-wireless edge network 200 combines Sommerfeld-Goubau lines placed on MV power lines 204 using MV infrastructure along with 802.11ad radios to provide last mile quasi-wireless communications. The quasi-wireless edge network 200 uses existing infrastructure (medium voltage power lines or coax) to allow easy distribution of the radio frequency (RF) subsection of WiGig chipsets over a large area (a street, neighborhood or home). Moreover, the quasi-wireless edge network 200 simplifies the data distribution over the area and lowers the power consumption and cost of the transceivers while solving mm-wave line of sight challenges and providing power for the radio by energy harvesting from the distribution wires.

A Goubau line (G-Line) or Sommerfeld-Goubau line is a single wire transmission line used to transmit/receive radio waves 301 at Ultra High Frequency (UHF) and microwave frequencies. A Goubau line has a dielectric coating on it, and a Sommerfeld line had no dielectric coating. The power line 204 does not have a dielectric and is considered a Sommerfeld-Goubau line. The strand mount device 220 couples to and from the power line 204 with a conical metal "launcher" or "catcher" having a narrow end connected, for example, to the shield of coaxial feed line with the transmission line passing through a hole in the conical tip of the conical metal "launcher" or "catcher."

Figure 3A:
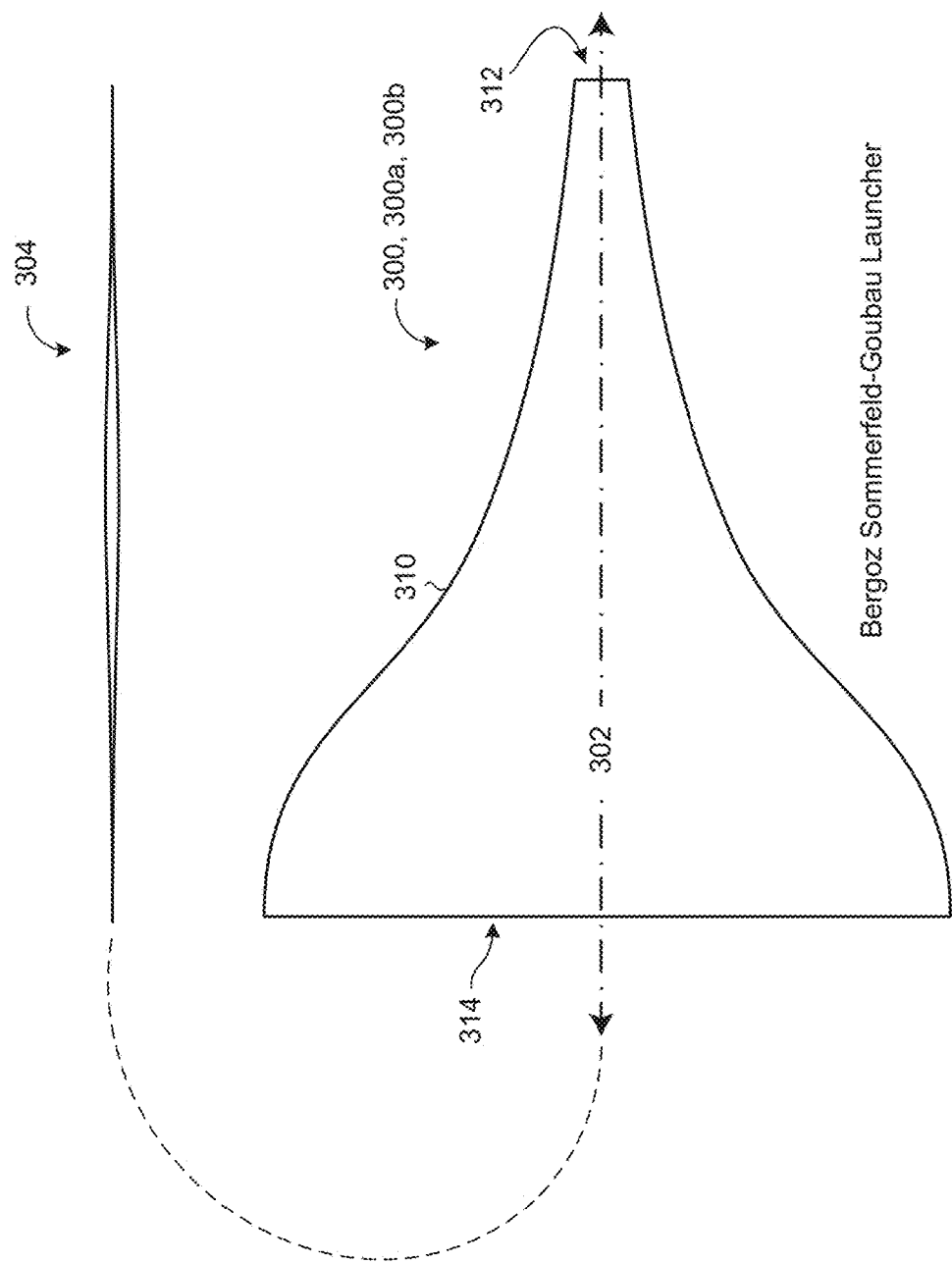
FIG. 3A is a schematic views of an example Sommerfeld-Goubau launcher/catcher.

Referring to FIG. 3A, the Sommerfeld-Goubau launcher 300, 300a and the Sommerfeld-Goubau catcher 300, 300b each include a substantially frustoconical shell 310 defining a longitudinal axis 302 and first and second openings 312, 314 along the longitudinal axis 302. The first opening 312 is smaller than the second opening 314. The power line 204 passes through the first opening 312 and the second opening 314 and along the longitudinal axis 302, and the first opening 312 is coupled to the power line 204.

Figure 3B:
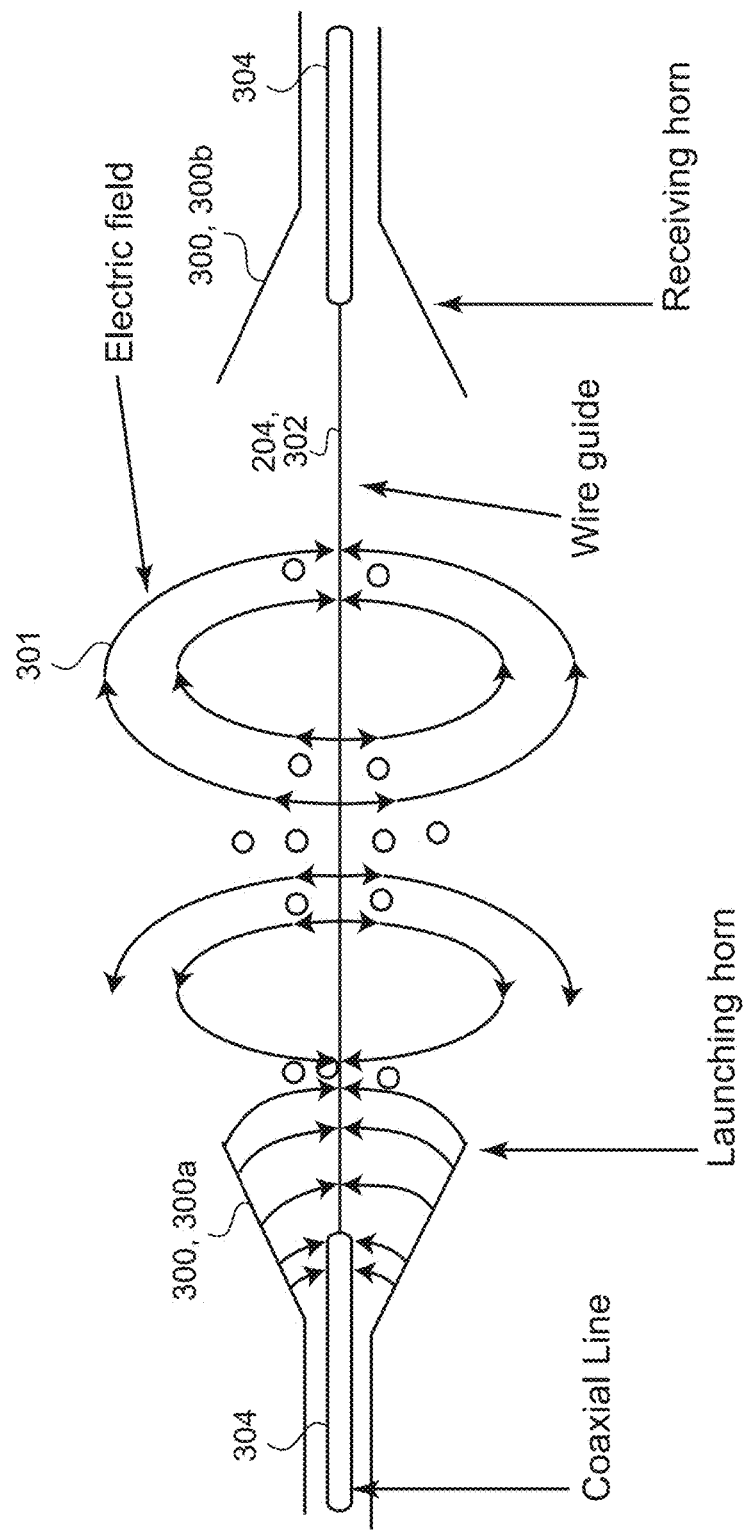
FIG. 3B is a schematic views of example Sommerfeld-Goubau launcher/catcher pair.
Figure 3C:
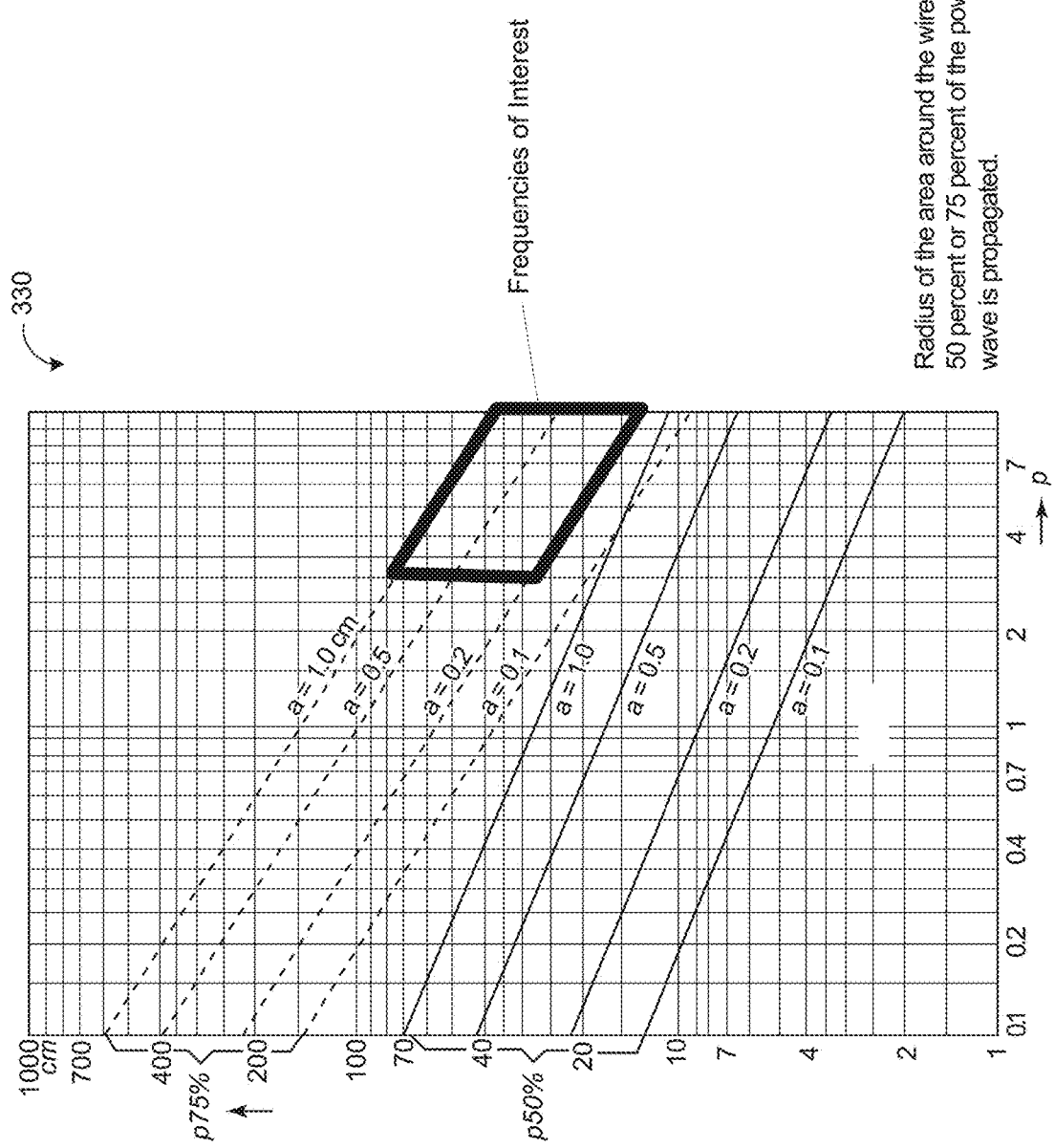
FIG. 3C is a graphical view of example loss characteristic of a solid copper wire at varying frequencies.
Figure 3D:
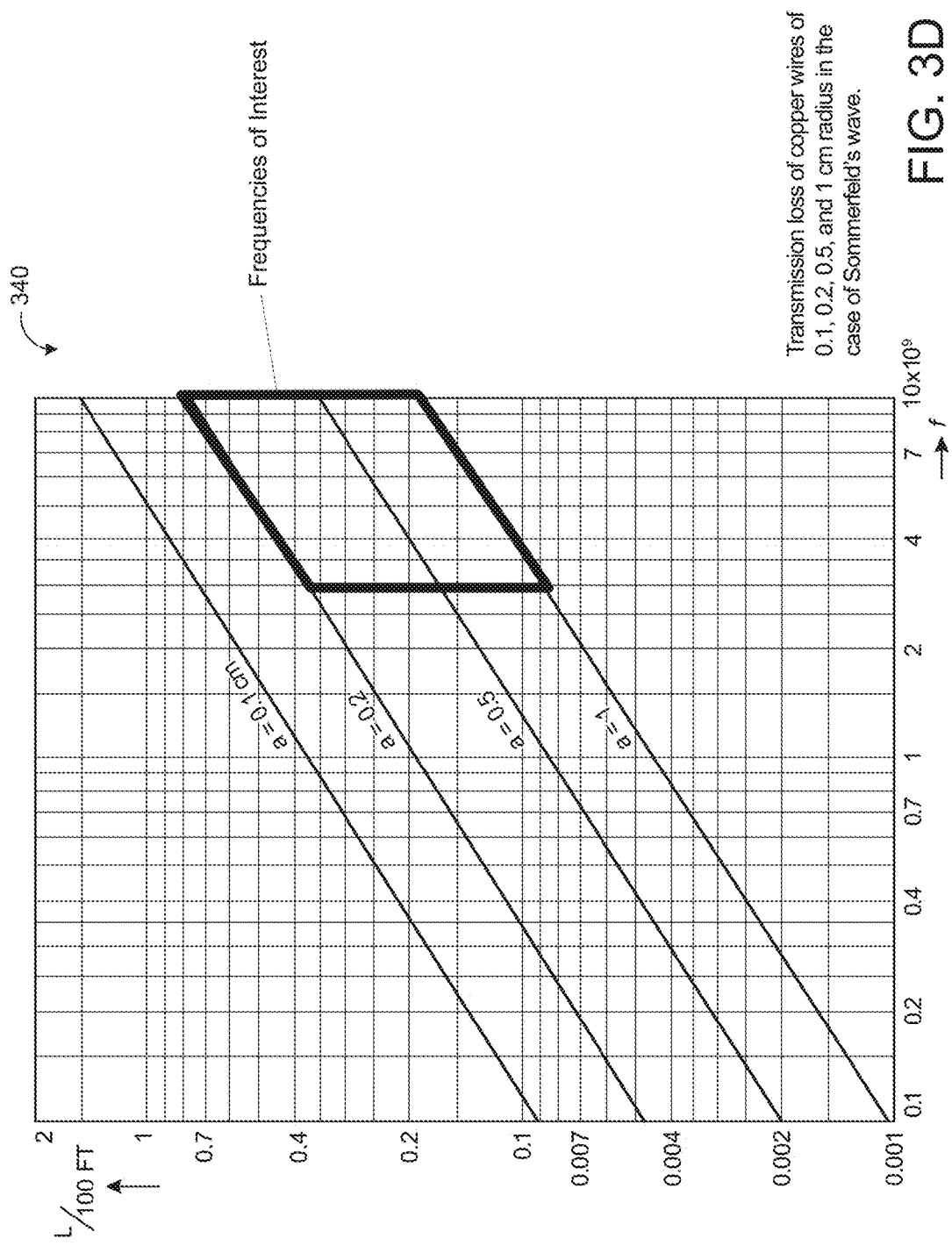
FIG. 3D is a graphical view of example sizes of an electromagnetic field in centimeters versus the frequency for a solid copper wire.
Figure 3E:
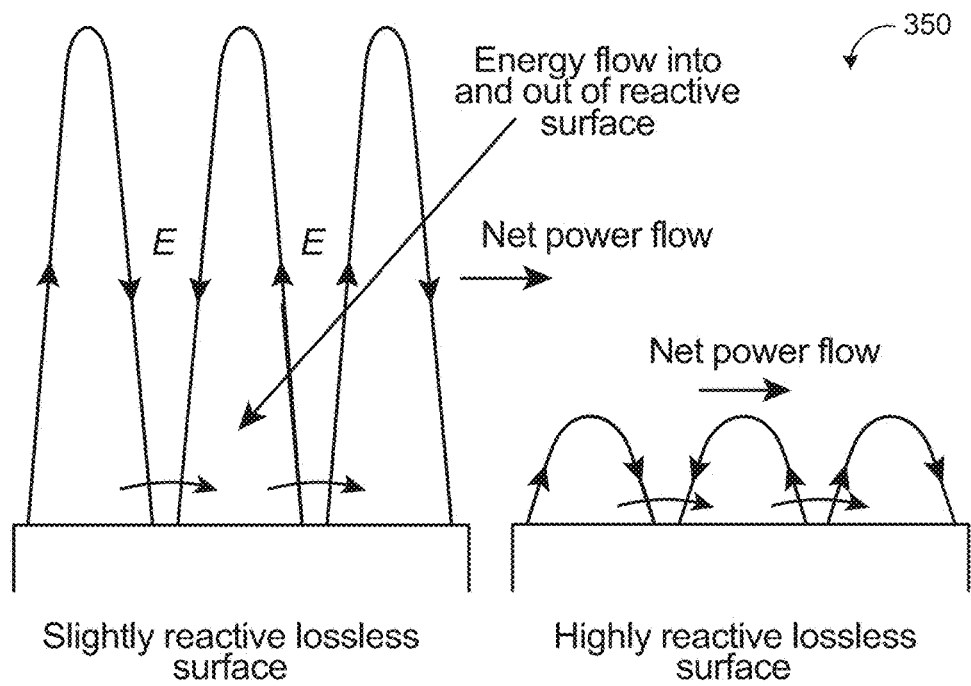
FIG. 3E is a schematic view of example field lines for various reactive surfaces.
Figure 3E:
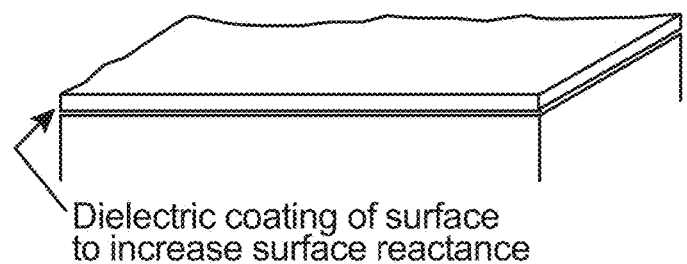
Figure 3E:
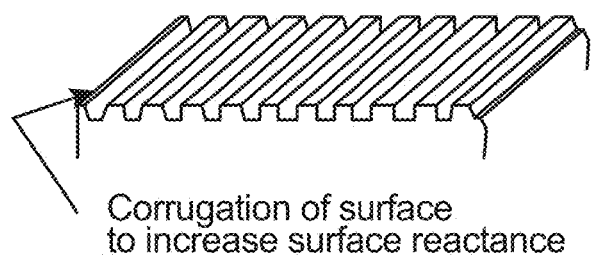
Figure 3F:
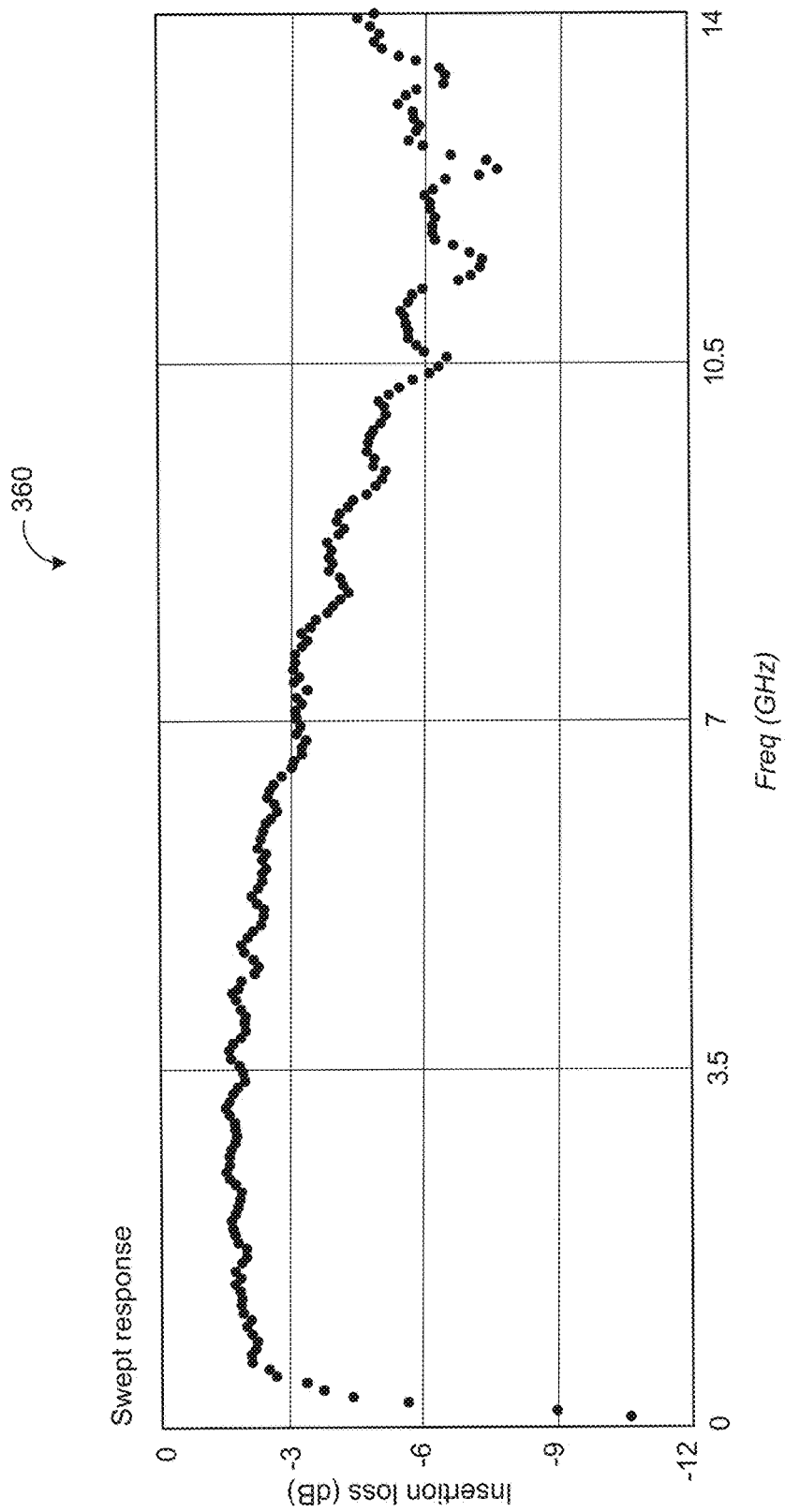
FIG. 3F is a graphical view of example insertion losses versus frequency for an example conductor line.

As shown in FIG. 3B, a conical launcher 300 on the single conductor 204, 304 creates an electric field and a magnetic field. A plot 330 illustrated in FIG. 3C shows the loss characteristic of a worst case solid copper wire at varying frequencies. The marked area represents frequencies of interest for the quasi-wireless edge network 200 with a worst case theoretical straight line loss in a solid copper wire of less than 1 dB for a 100-feet power line. The size of the electromagnetic field of the wave 301 around the wire 204 is inversely related to the square of the frequency. Therefore, the larger the electromagnetic field, the less tolerant the waveguide is to bends and the presence of obstructions in the field. A plot 340 illustrated in FIG. 3D shows example sizes of an electromagnetic field in centimeters versus the frequency for a solid copper wire. The size of the electromagnetic field is additionally related to the speed of the wave 301. Threading the wire or adding a dielectric slows the wave 301 to reduce the size of the field, thus improving the performance and practicality for the lower frequencies. A plot 350 shown in FIG. 3E shows the field lines for more and less reactive surfaces. A plot 360 shown in FIG. 3F shows an example plot of insertion loss versus frequency for an example conductor line 204, 304.

The Sommerfeld-Goubau launcher pair has the benefit of a few GHz of bandwidth and the ability to pass data without line-of-sight between the strand mount devices 220. The Sommerfeld-Goubau launcher pair suffers, however, from a limited link budget due to the limitations on the transmit power (due to FCC emissions limits). As a result, the strand mount device 220 may need amplification every few hundred feet.

Figure 3G:
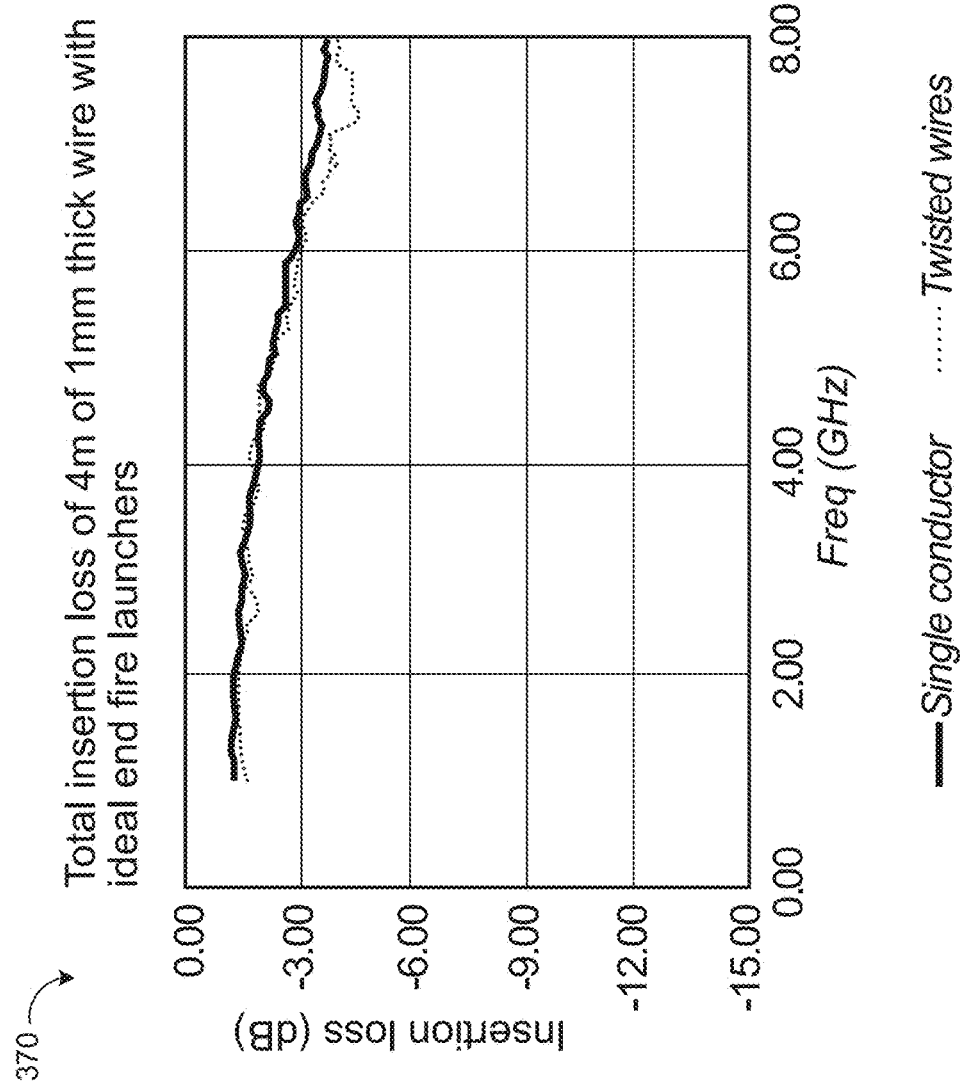
FIGS. 3G and 3H are graphical views of example insertion losses versus frequency for an example Sommerfeld-Goubau launcher.
Figure 3H:
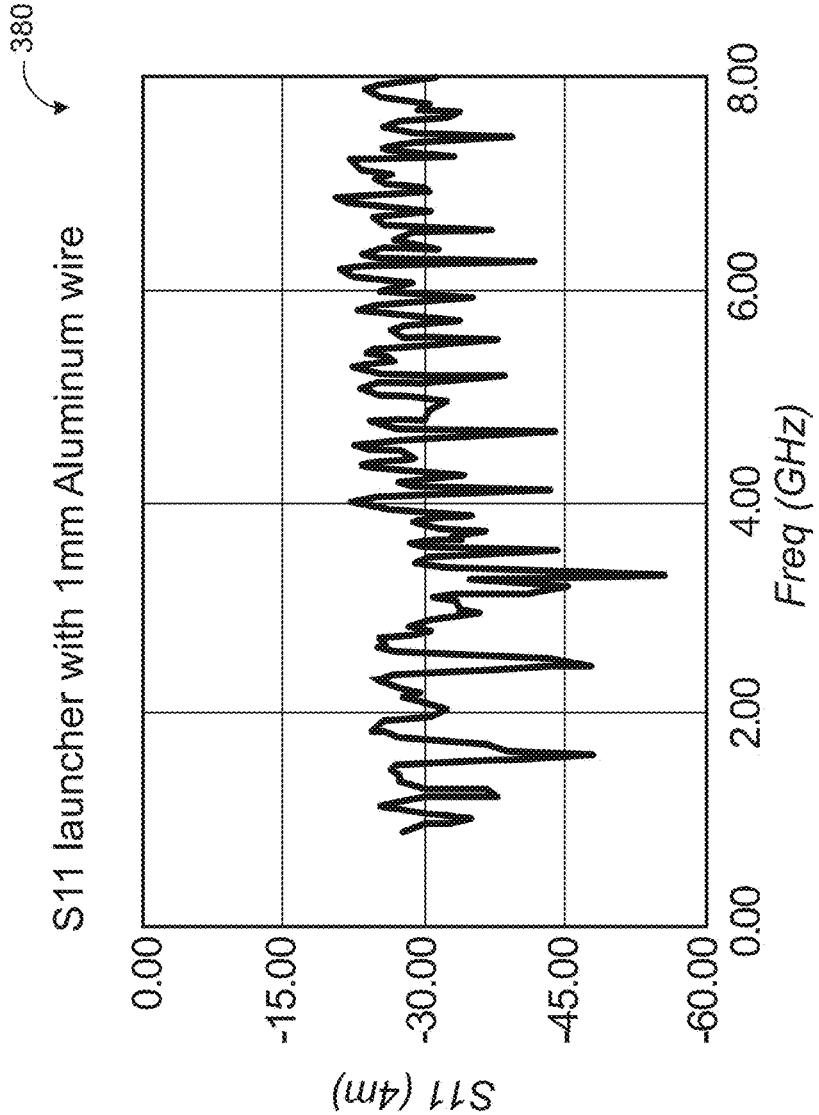
Figure 3I:
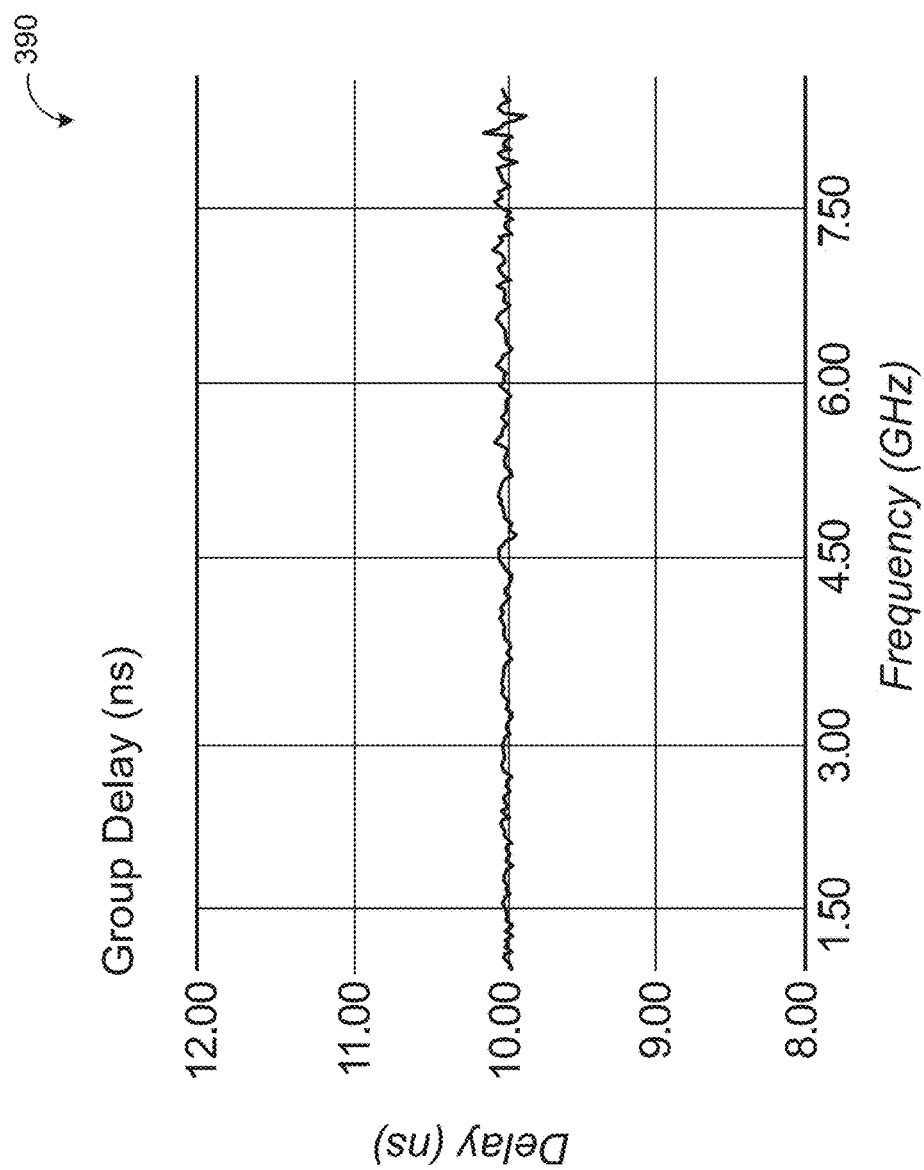
FIG. 3I is a graphical view of example delays versus frequency for an example Sommerfeld-Goubau launcher.

In some examples, the strand mount device 220 includes a pair of surface wave launchers/catchers 300 having a 3 dB bandwidth from 500 MHz to 9.5 GHz. A total loss measured including the pair of surface wave launchers and 4 meters of 1 mm thick conductor is less than 2 dB at 1 GHz. The S11 and S21 are shown in plots 370, 380 illustrated in FIGS. 3G and 3H. In addition, the group delay system was measured and is shown a plot 390 illustrated in FIG. 3I. The results show that a surface wave launcher pair mounted on a medium voltage power line is capable of inductively tapping a few watts of power via a current transformer (CT) or other energy harvesting device, and the tapped in power can be used for inline amplifiers along with any radio hardware. Therefore, the strand mount device 220 can both communicate data along the MV power line 204 (via the surface wave 301) and inductively tap power from the MV power line 204 to power the strand mount device 220 itself.

Figure 4B:
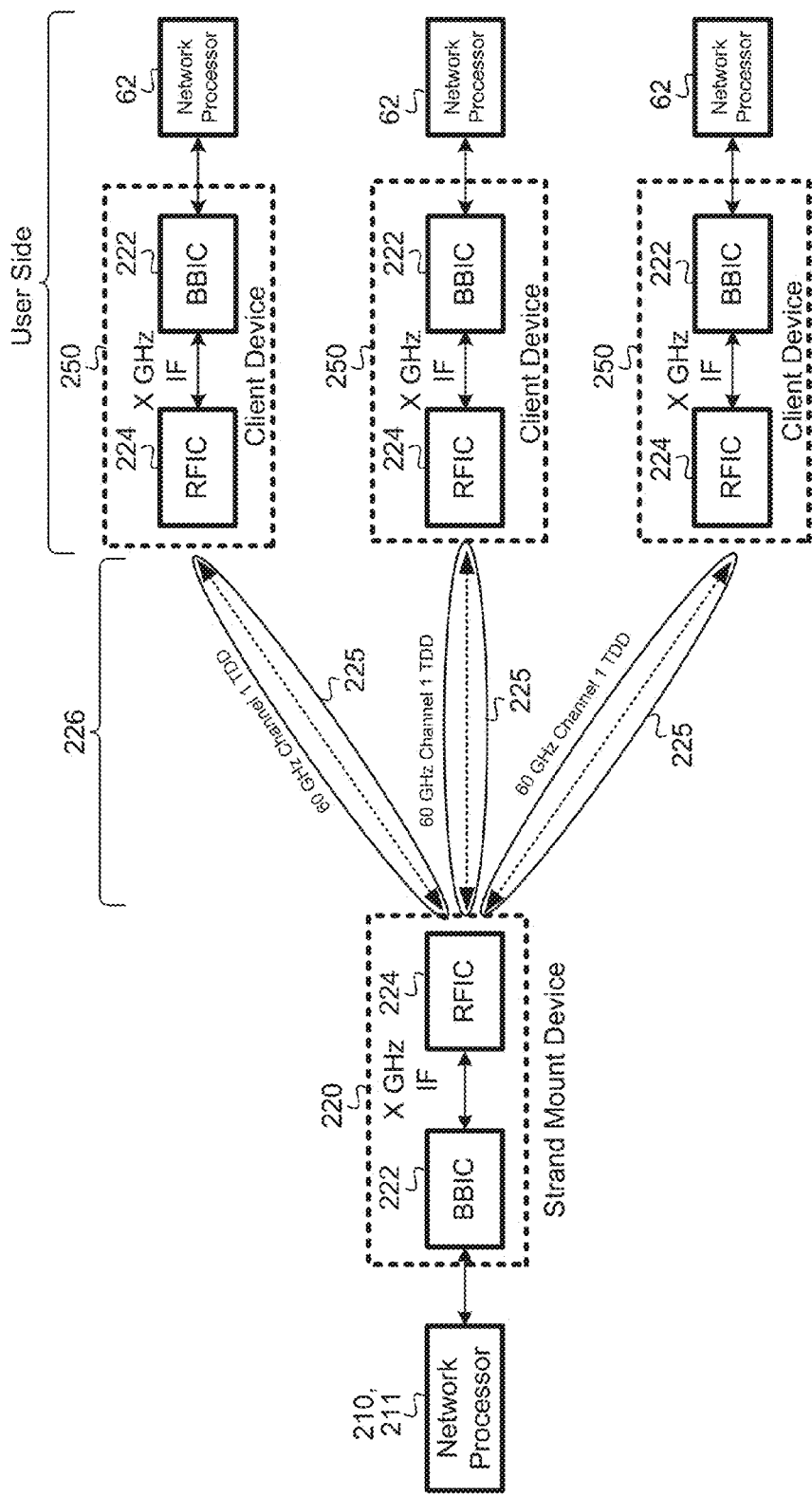

Referring to FIGS. 4A-4D, in some implementations, the strand mount device 220 includes a wireless communication device, such as an 802.11ad radio, for wirelessly communicating with the in-house user devices 250. Each in-house user device 250 may be associated with a corresponding network processor 62. The designation 802.11ad is an extension of the IEEE's popular 802.11 family of wireless local-area network (LAN) standards, generally known as Wi-Fi. The 802.11ad version is also known by its trade name WiGig (Wireless Gigabit). The WiGig specification allows devices to communicate wirelessly at multi-gigabit speeds. 802.11ad (WiGig) uses a 60 GHz carrier frequency for the wireless link. The free space loss at this frequency is very high, along with the oxygen absorption and rain losses. This limits the range between devices communicating using WiGig to less than 50-200 meters (depending on antenna gain) and clear line of sight. The benefit is a higher capacity due to larger available bandwidth and less interference due to narrower beams and higher losses. 802.11ad (WiGig) chipsets use a single 2.16 GHz channel in the V band in a Time-Division-Duplexing (TDD) configuration to create a gigabit link as shown in FIG. 4A. The 802.11ad chipset allows a single Baseband Integrated circuit (BBIC) 222 to drive multiple Radio Frequency Integrated Circuits (RFICs) 224. In the example shown in FIG. 4A, a strand mount device 220 communicates an RF signal 225 from its RFIC 224 via an RF link 226 to another strand mount device 220 and/or a user device 250, which has a corresponding RFIC 224. Moreover, the strand mount device may include a housing 221 configured to mount on the power line 204 and house the Sommerfeld-Goubau catcher 300, 300b, the Sommerfeld-Goubau launcher 300, 300a, and the at least one RFIC 224. WiGig chipsets, as shown in FIG. 4B, are capable of serving multiple wireless links 226 (three links shown) by creating codebooks to represent the antenna pattern for the link 226 to each user. Therefore, 802.11ad is capable of time sharing multiple RF links 226.

Figure 4C:
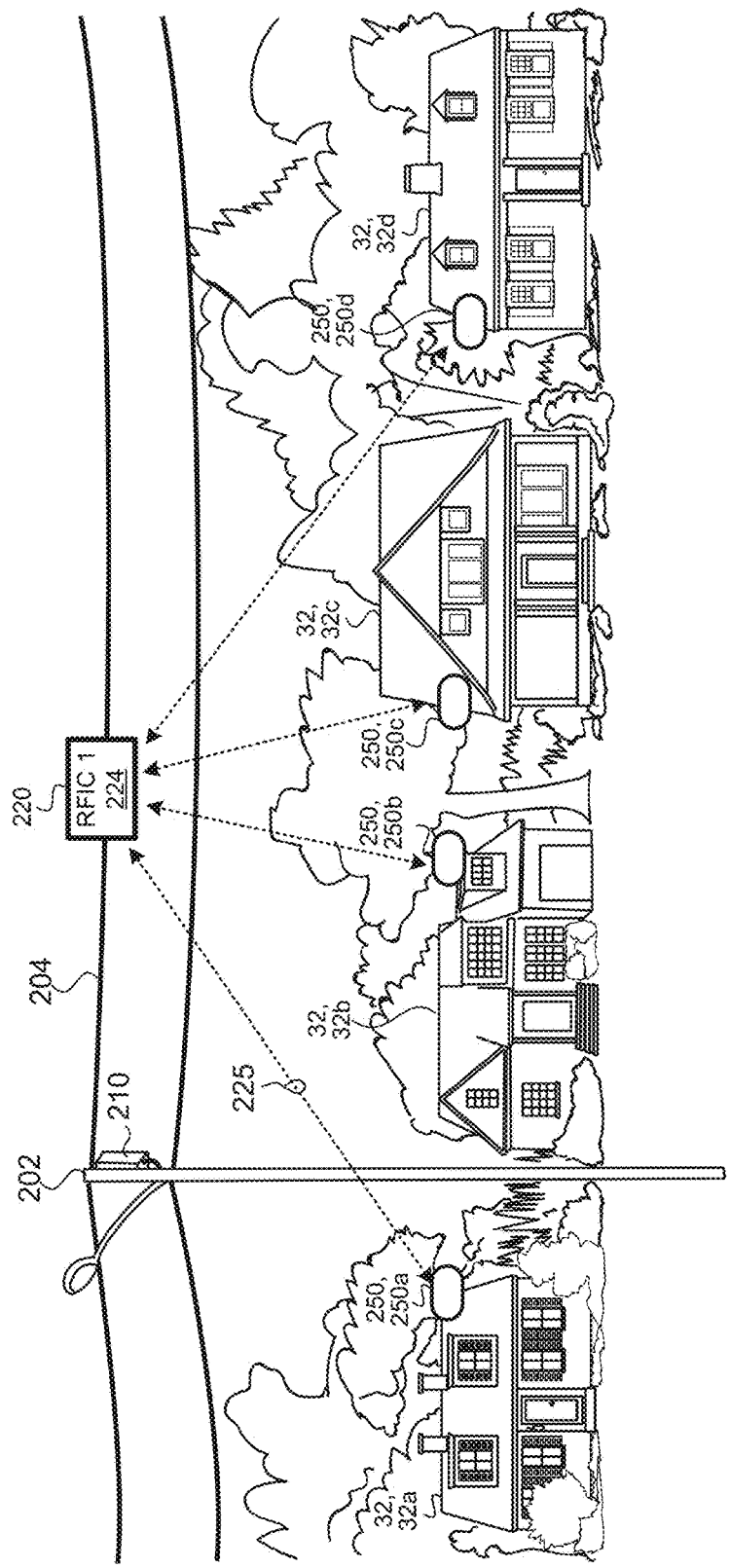

WiGig uses the unlicensed industrial, scientific and medical (ISM) 60-GHz band from 57 to 64 GHz, divided into four 2.16-GHz bands. The primary modulation scheme, orthogonal frequency division multiplexing (OFDM), can support a data rate up to 7 Gbits, making it one of the fastest wireless technologies available. The standard also defines a single carrier mode that uses less power and is a better fit for some portable handheld devices. The single carrier mode can deliver a data rate up to 4.6 Gbits. Both speeds permit the transmission of uncompressed video. The WiGig specification also provides security in the form of the Advanced Encryption Standard (AES). One challenge of using a 60 GHz radio for the drop link to the home is the challenge of finding line of sight (LOS) from a vertical asset, such as a utility pole 202 to the neighboring houses 32 it must serve, as shown in FIG. 4C.

Figure 4D:
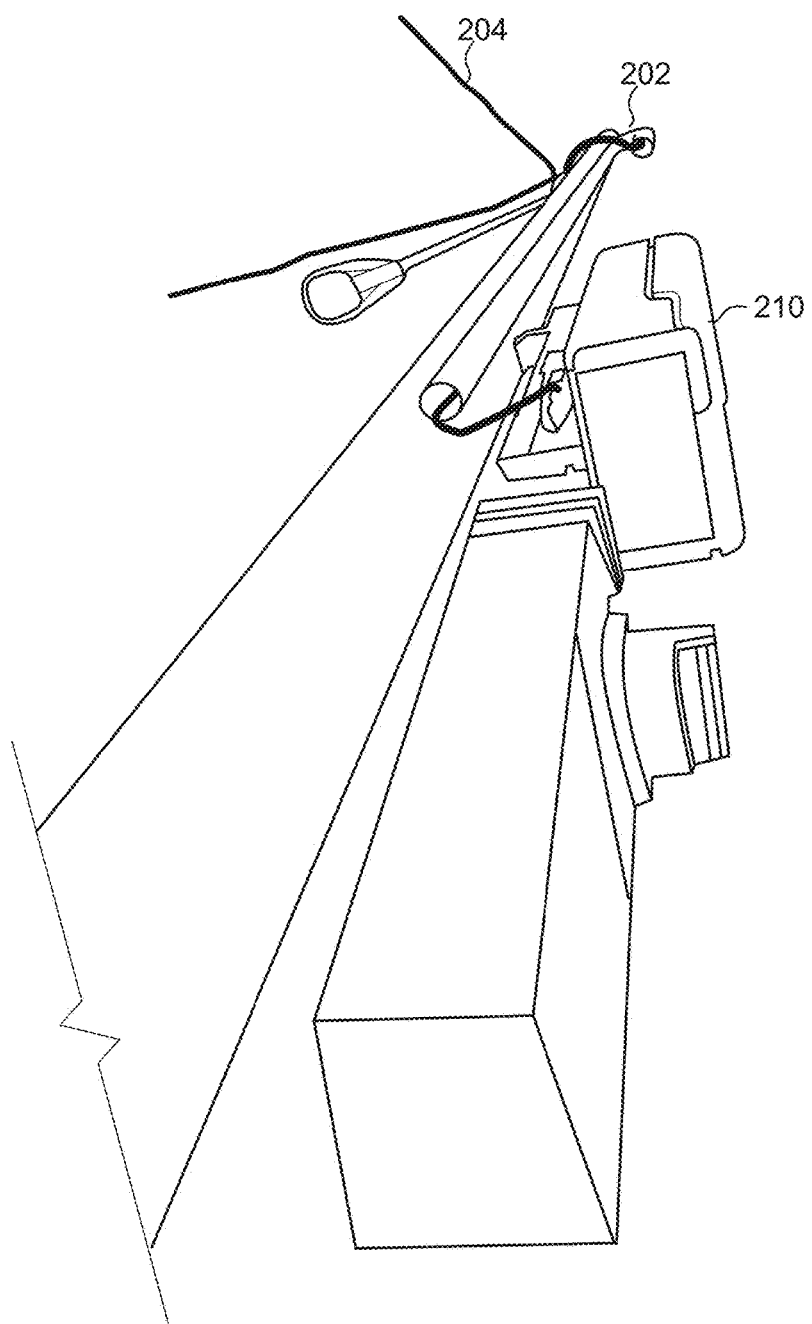

Another challenge is providing power to the drop box (i.e., the network device 210) if it is mounted at a utility pole 202. As the power on the medium voltage distribution is 3 kV to 35 kV, the drop box 210 typically has a connection to a step-down transformer and a utility meter as shown in FIG. 4D. This adds cost and complexity to the deployment of a fiber-to-the-node (FTTN) system. The access network 100 limits this cost and complexity by have a single network device 210 for each quasi-wireless edge network 200 and the strand mount devices 220 outperform alternatives, such as Non-Line-Of-Sight (NLOS) radios, which typically do not have enough capacity to meet current capacity targets, and millimeter-wave radios that require a clear line of sight (no obstruction from tree covers) and distance of a few hundred feet between nodes.

Figure 5:
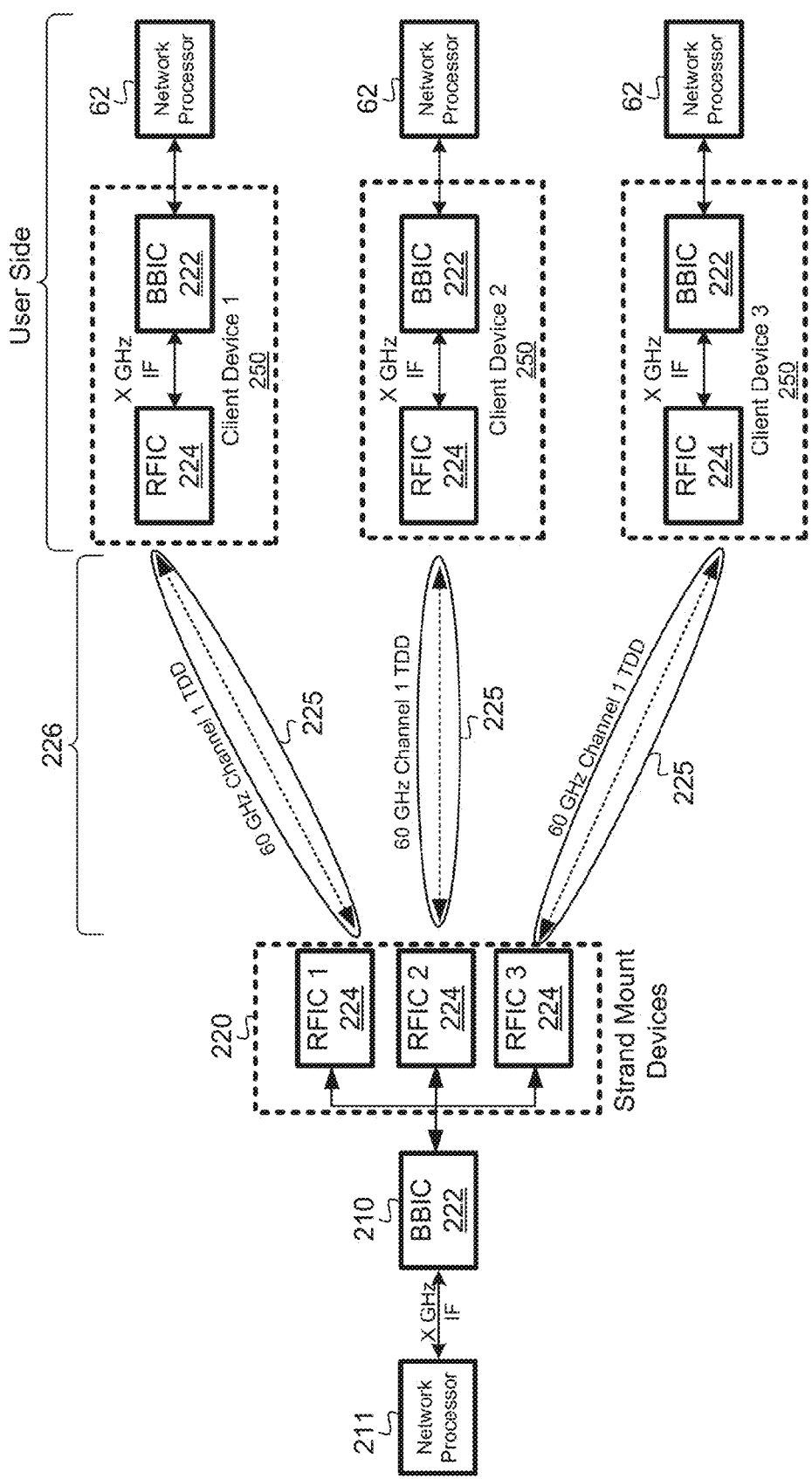
FIG. 5 is a schematic view of an example BBIC/RFICs communication link between a Baseband Integrated circuit (BBIC) and a Radio Frequency Integrated Circuit (RFIC) with increased link budget.

Referring to FIG. 5, in some implementations, the quasi-wireless edge network 200 leverages the design of the 802.11ad chipsets, by having a single BBIC 222 drive multiple RFICs 224, as discussed earlier. An RFIC is a chip that transmits and receives radio waves. In some examples, RF chips are found in portable telephones, cellphones, Wi-Fi devices, wireless routers, wireless base stations, satellite transceivers and microwave equipment. For example, smartphones typically have multiple radios that handle cellular voice and data, GPS and Wi-Fi, and all of these radios may be contained on one or two RFICs. BBIC, also known as a baseband radio processor, is a device in a network interface that manages radio functions (i.e., all functions that need an antenna). The BBIC 222 may be responsible for data traffic over the quasi-wireless edge network 200 by applying MAC WiGig physical media to encode received media. Allowing multiple RFICs to be driven from the same BBIC, allows for an increase in antenna gain or allows for antenna diversity in case client devices are distributed around the access point (AP), as shown in FIG. 4B.

Figure 6A:
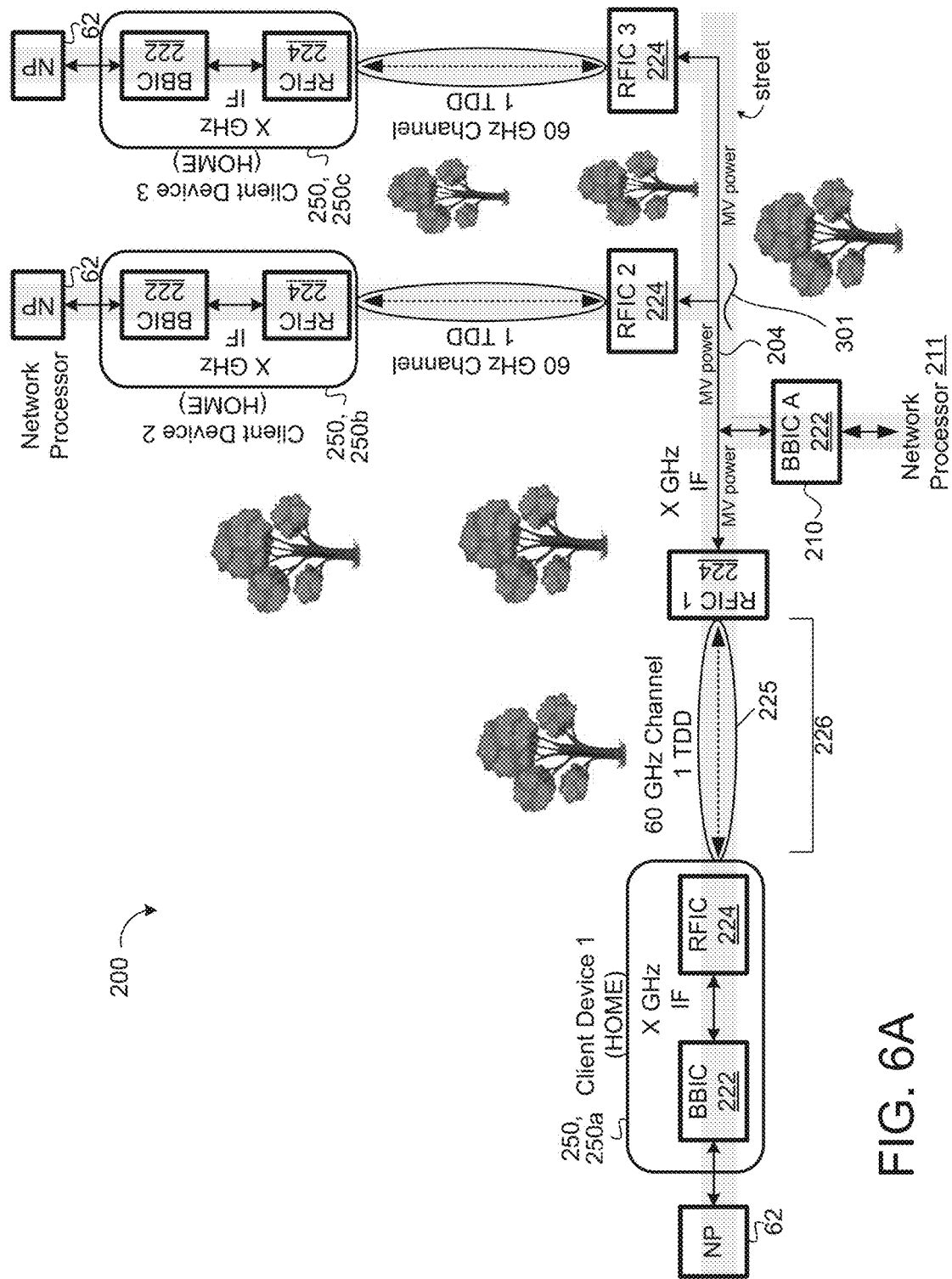
Figure 6B:
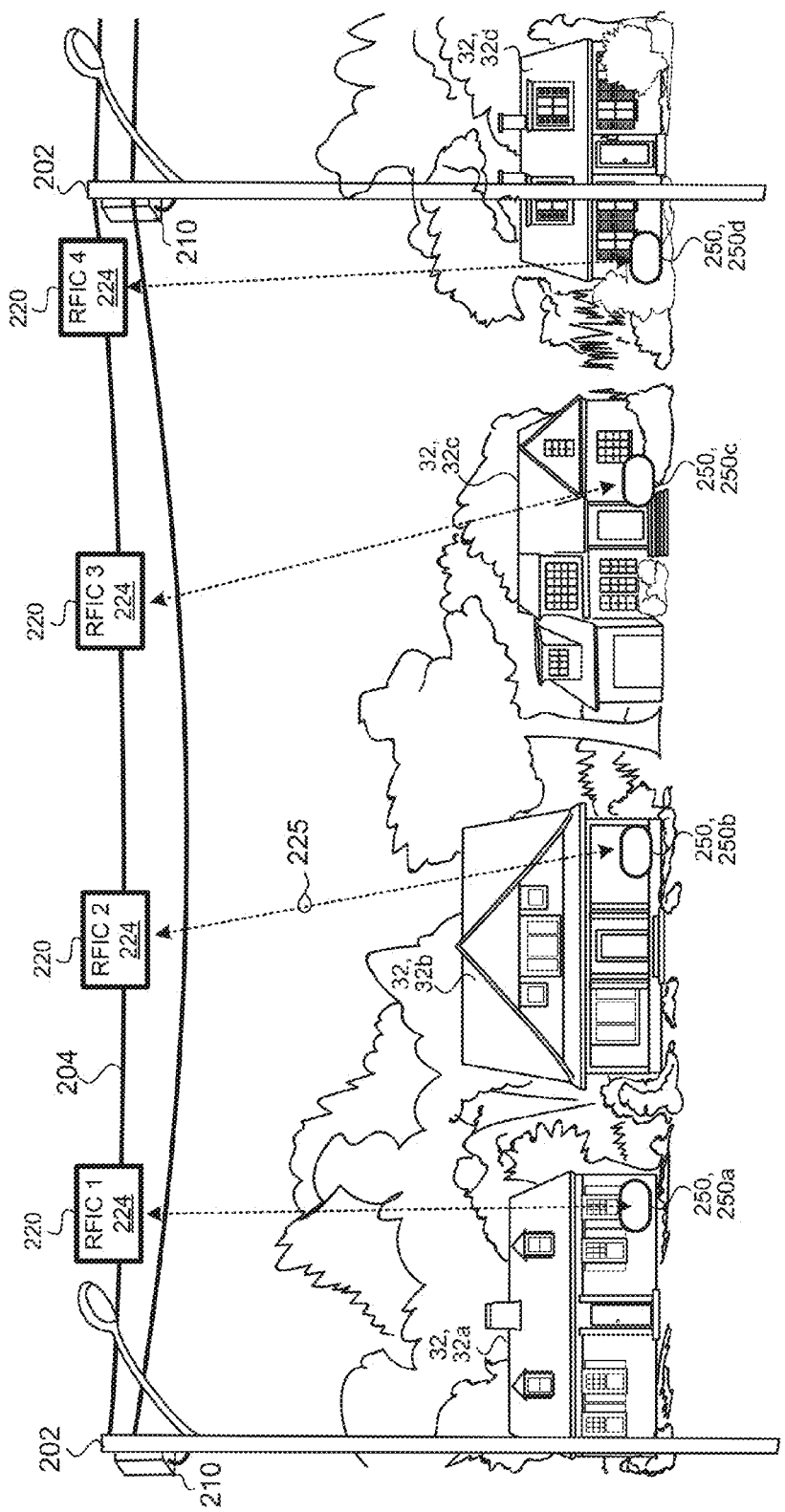

FIGS. 6A-6C illustrate an example implementation of the quasi-wireless edge network 200 over a larger area. As shown, the RFIC tiles 224, e.g., RFIC 1, RFIC 2, RFIC 3, face different directions and client devices (diversity). Also as shown, RFIC 1 faces Client Device 1 250, 250a, RFIC 2 faces Client Device 2 250b, and RFIC 3 faces Client Device 3 250c. Separating the RFIC tiles 224 so that they face different directions and client devices 250 (diversity), would not result in array gain, but would allow the users to be on different sides of the network device 210 (i.e., BBIC A) while sharing the same BBIC (i.e., BBIC A) and network processor 211. Therefore, by extending this one-wire interface between the BBIC 222 and the RFICs 224 down the street, it is possible to create a wireless link to each home 32 (e.g., houses 32a-c) on the street and avoid the challenges of a single point having to find near line-of-sight to more than one home (as shown previously in FIG. 4C). Each client device 250 may be associated with a corresponding network processor 62.

Merging the concept of the quasi-wireless edge network 200 (e.g., the Sommerfeld-Goubau launchers 300 connected to the medium voltage power-line 204) with GPON architecture results in a fiber connection to the start of the block, which is connected to a network processor and the WiGig BBIC 222. The one-wire connection, between the BBIC 222 and the RFICs 224, is then transmitted via the power-line 204 down the block reaching the homes 32 of the users 30. In front of each home 32 on the block or each group of homes 32, a strand mount device 220, which includes a pair of Sommerfeld-Goubau launchers 300 along with an RFIC 224 or set of RFICs 224 to make a wireless link to the customer premises 32 (e.g., houses 32a-c), is attached to the MV power line 204.

The near line-of-sight challenge described with respect to FIG. 4C is alleviated, since a wireless connection between the home 32 and any place along the power line 204 is possible (see FIG. 6B). Therefore, the strand mount device 220 may be deployed anywhere on the power-line 204 to provide near line-of-sight and is not restricted by being installed on the utility pole 202, which may not have a near line-of-sight with the house. mm-Wave communications do not need perfect line-of-sight and can tolerate some amount of obstructions in the fresnel zone, which is called "near line-of-sight." FIG. 6B illustrates the same four houses 32, 32a-d shown in FIG. 4C and how line of sight is possible from some point along the power-line 204 to a given home 32. FIG. 6C illustrates the strand mount devices 220 installed on the power-line 204 between the utility poles 202. The quasi-wireless edge network 200 creates lower power (<5 watts), a highly distributed (25-50 m range) mm-Wave nodes or strand mount devices 220 that are easily installed on power-lines 204 in the same way "donut" line monitors are used. Moreover, the use of a Sommerfeld-Goubau type mode launcher to extend the IF connection between the BBIC and RFICs down the street block.

The quasi-wireless edge network 200 provides three main benefits among others: significant degrees of freedom to address mmWave/near line-of-sight deployment challenges; provides power for the nodes (i.e., the strand mount devices 220 and the network device 210); and allows for a low cost mm-Wave node by removing the need for the BBIC and network processor at each strand mount device.

Figure 7A:
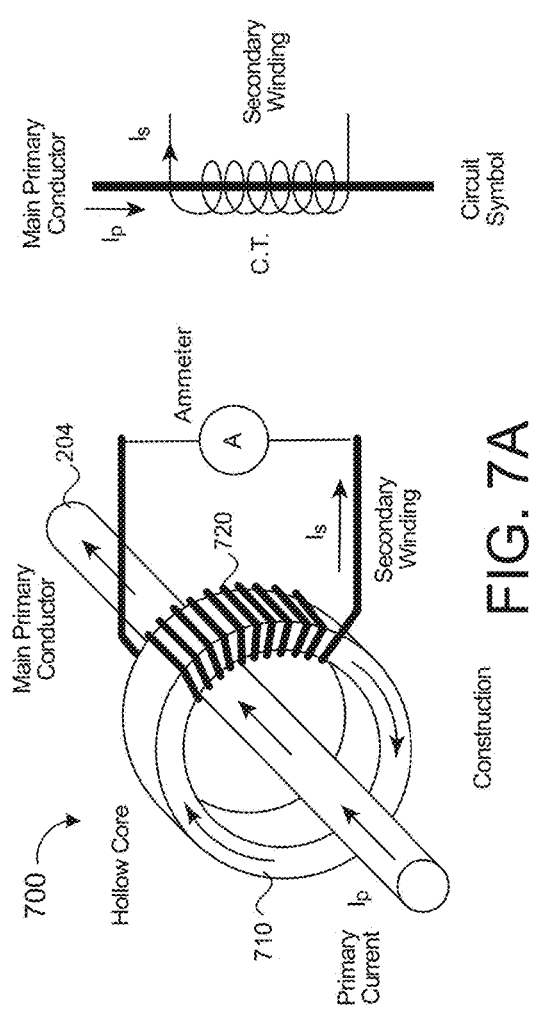
FIGS. 7A and 7B are schematic views of an example current transformer device used to power strand mount components of an example communication network.
Figure 7B:
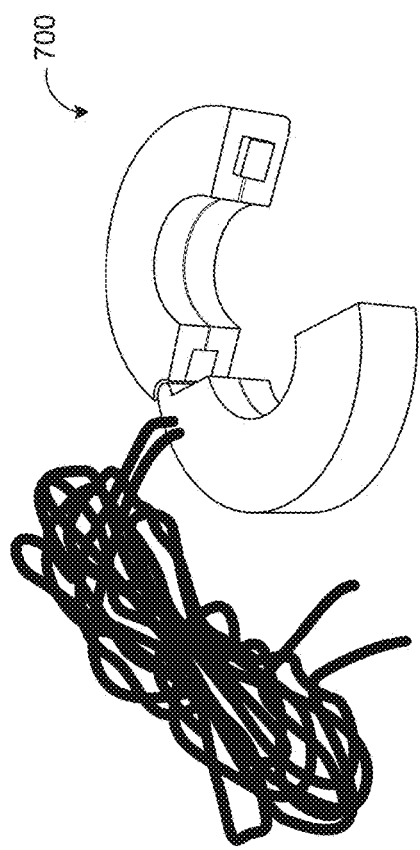

In some examples, amplifiers 228 are used to amplify the signal as it travels through the MV power-line 204. Referring to FIGS. 7A and 7B, the power for the amplifiers 228 and RFICs 224 may be provided by a current transformer (CT) 700 that extracts a few Watts of power from the power-line 202. The CT 700 includes a primary conductor 710 and a secondary winding 720, and produces an alternating current (AC) Is in its secondary winding 720, which is proportional to the AC $I_P$ in its primary conductor 710. In other words, the CT 700 traps the magnetic field to produce a current Is in the secondary winding 720. In some examples, a flux capacitor may be used instead of the CT 700. The flux capacitor uses the electric field gradient between two points outside of the wire; since the voltage is high on the power-lines, flux capacitor can harvest energy. In some examples, the current provided by the power-line fluctuates depending on the number of people using power; while the voltage is constant during the day. As a result, using the flux capacitor may be more reliable.

The strand mount hardware may include monitoring equipment to detect the voltage, current, power factor, harmonics and communication equipment to transmit this data back to the utility company. The strand mount device 220 can additionally detect if there is a short or open in the power lines 204 to which it is connected and also detect if there are tree branches touching the power lines 204. This information can also be communicated back to the utility.

Adjusting Frequency

Figure 8B:
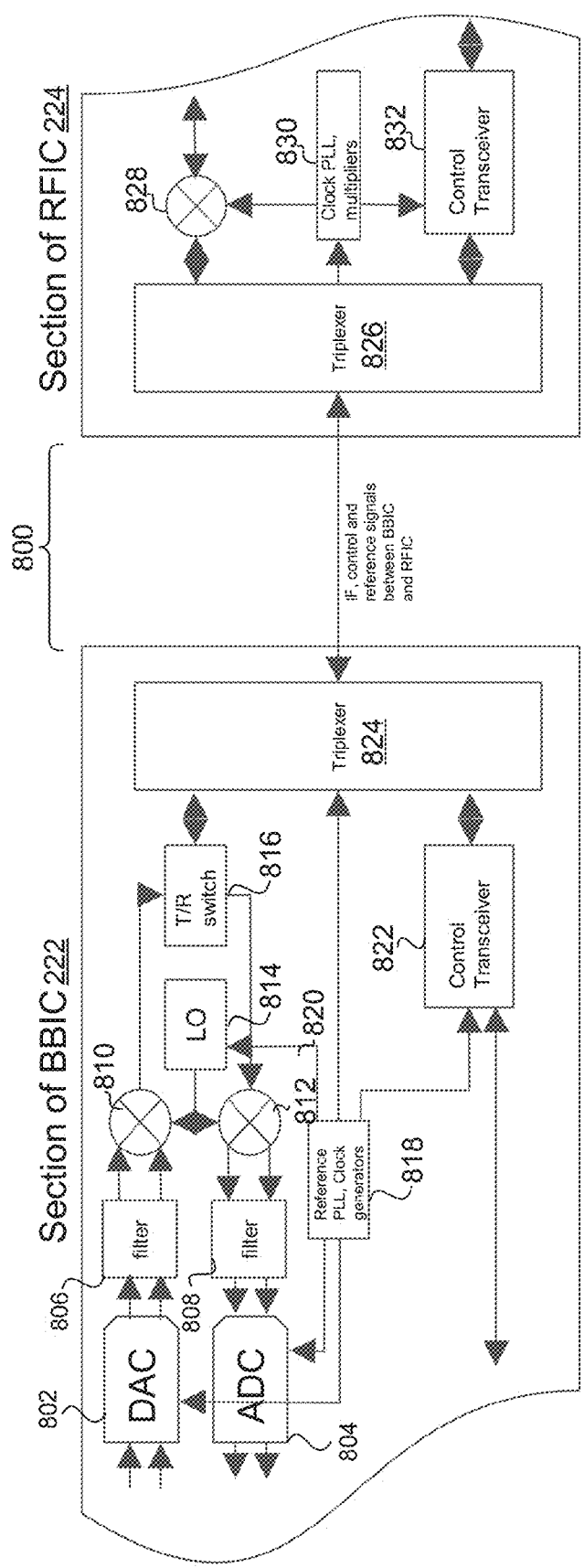
FIG. 8B is a schematic view of an example BBIC and RFIC communicating over a communication link.

Referring to FIGS. 8A and 8B, the connection between the BBIC 222 and the RFICs 224 can be a one wire interface 800 (as shown in FIG. 8B), which combines a local oscillator (LO) 814 carrying a reference signal 820, IF (intermediate frequency carrying the transmitted communication data) data signals and control signals (that identifies the destination of the communication data, i.e., which end user, code book etc.). FIGS. 8A and 8B show one example of the frequency allocation of the various signals along with an example WiGig chipset interface. The BBIC 222 may be configured to construct IF data for a wireless interface 800 and control signals for controlling at least one RFIC 224 based on a received optical signal (e.g., received at an optical transceiver).

In some implementations, when using the BBIC and RFIC shown in FIGS. 8A and 8B, the frequencies of the IF data, control signals and Reference passing between the BBIC 222 and the RFIC 224 along the wire interface 800 does not match the passband frequency of Sommerfeld-Goubau line. The frequency response of the power-line 204 is approximately 1.5 GHz to 8 GHz. Therefore, the signals of the chipset (i.e., the BBIC and the RFIC) need to be frequency translated to be within the band (e.g., 1.5 GHz and 8 GHz). In one example the Reference signal may be shifted up to 1.98 GHz; and the IF signal may be shifted down to 6.36 GHz. Determining the frequencies of the IF, Reference, and control signals is a tradeoff between the National Telecommunications and Information Administration's (NTIA) masked frequencies, separation between bands for simplicity of triplexer design (shown in FIGS. 10-12), and reducing overall bandwidth to simplify the Goubau launcher design (i.e., the strand mount device).

Referring to FIG. 8B, a section of the BBIC 222 includes a digital-to-analog converter (DAC) 802, an analog-to-digital converter (ADC) 804, first and second filters 806, 808, first and second comparers 810, 812, the LO 814, a transceiver switch 816, a reference block 818, a control transceiver 822, and a triplexer 824. The RFIC 224 includes a triplexer 826 that interfaces with the triplexer 824 of the BBIC 222 via the wireless interface 800, and provides signals to a third comparer 828, a clock 830, and control transceiver 832.

Figure 9:
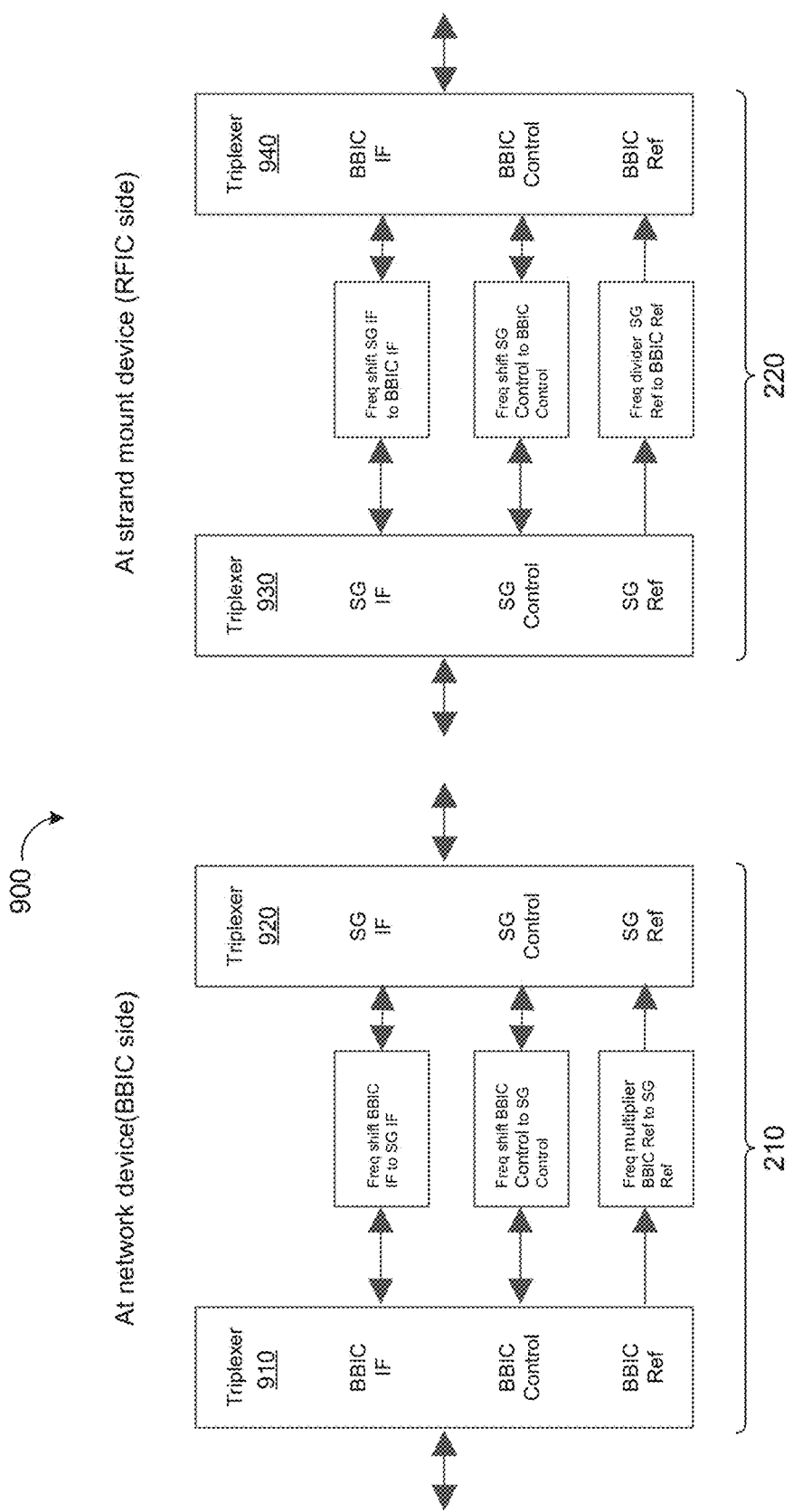
FIG. 9 is a schematic view of an example circuit for implementing a frequency shift in a quasi-wireless edge network.

FIG. 9 is a schematic view of an example circuit 900 for implementing the frequency shift at launch, on the BBIC side and at the repeater, on RFIC side. Other frequency shifting schemes are possible as well. In the example shown, at the network device 210, a first triplexer 910 associated with the BBIC 222 interfaces between the BBIC 222 and a second triplexer 920 associated with communicating with the strand mount device 220. Similarly, at the strand mount device 220, a third triplexer 930 associated with communicating with the network device 210 interfaces between the network device 210 and a fourth triplexer 940 associated with the RFIC 224. The network device 210 implements frequency shifts/multiplications via the first and second triplexers 910, 920. For example, the network device 210: (a) shifts a BBIC intermediate frequency (IF) (e.g., an intermediate frequency carrying communication data) to a Sommerfeld-Goubau (SG) IF; (b) shifts a BBIC control frequency (e.g., a frequency that identifies the destination of the communication data, i.e., which end user, code book etc.) to a SG control frequency); and (c) multiplies a BBIC reference frequency (e.g., local oscillator reference signal) to a SG reference frequency. In a similar fashion, the strand mount device 220 implements frequency shifts/divisions via the third and fourth triplexers 930, 940. For example, the strand mount device 220: (a) shifts the SG IF back to the BBIC IF; (b) shifts the SG control frequency back to the BBIC control frequency; and (c) divides the SG reference frequency back to the BBIC reference frequency.

Amplification

The Time-Division-Duplexing (TDD) nature of the IF traffic does not directly lend itself for easy in-line amplification down the street within the quasi-wireless edge network 200. There are a few approaches to solve this problem that allows for amplification of the signals. One approach, entails sending a control signal either via the control channel of the one-wire interface (between the BBIC 222 and the RFIC 224) or by encoding a simple Amplitude-shift-keying (ASK) signal on a carrier frequency and sending that control information to the various in-line amplifiers. The in-line amplifiers could then switch a pair of transmit/receive switches to alternate between bidirectional amplifiers amplifying the appropriate IF traffic.

Figure 10:
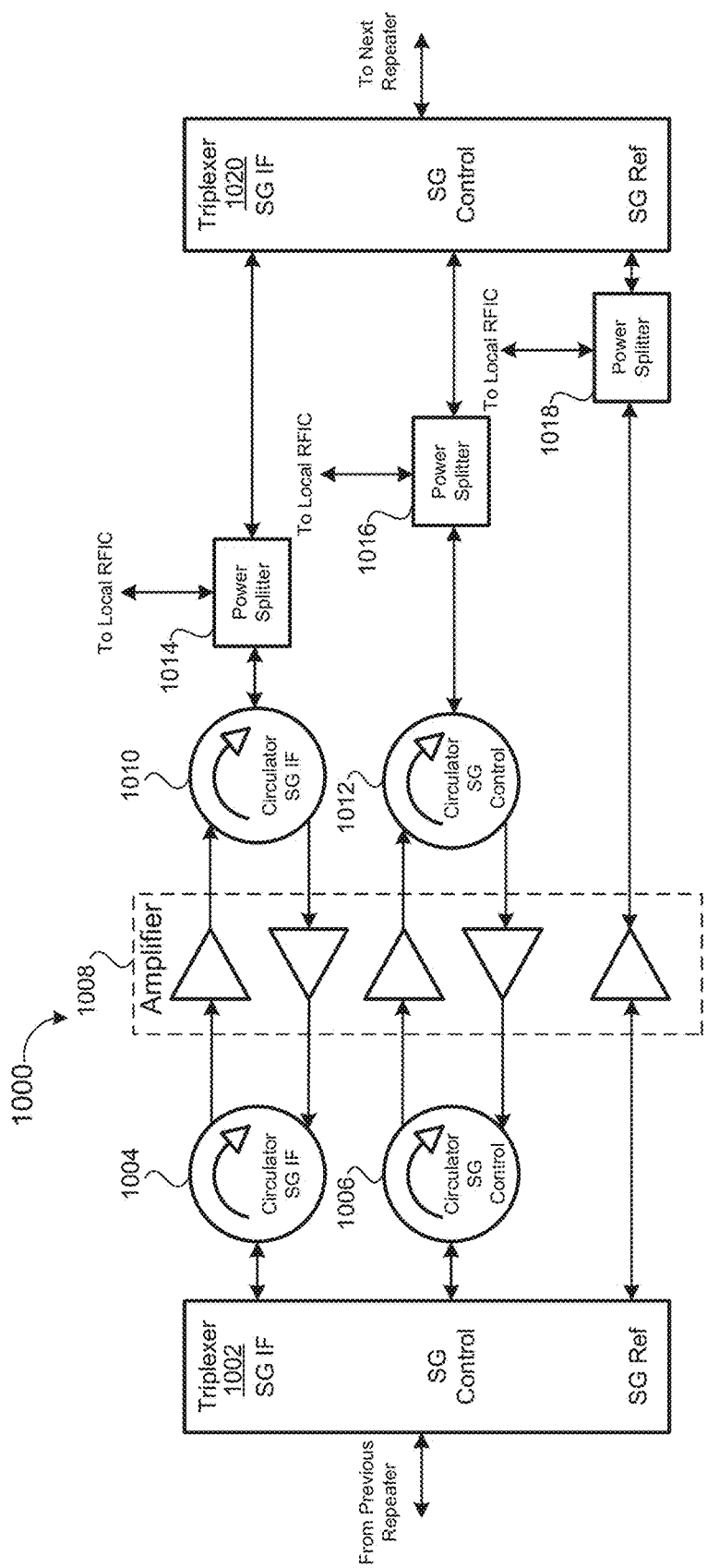
FIG. 10 is a schematic view of an example circuit of a strand mount amplifier using circulators.
Figure 12:
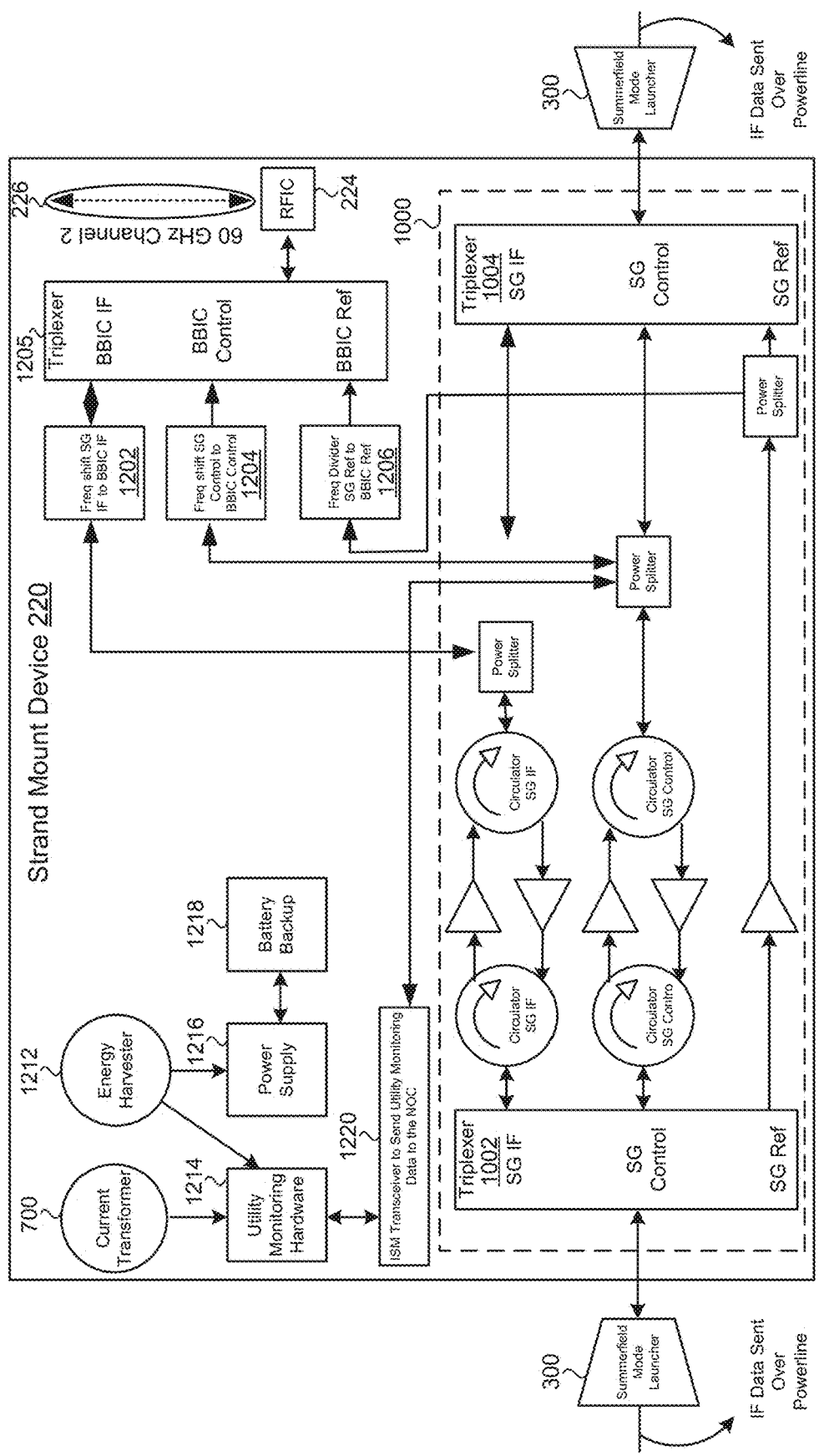
FIG. 12 is a schematic view of an example circuit of a strand mount device.

FIG. 10 illustrates an example circuit 1000 that allows the use of devices, such as radio frequency (RF) circulators, to split the uplink and downlink signals and amplify them accordingly. In this case, the circuit 1000 uses corresponding amplifiers 1008 to boost the signal of the REF, Control, and IF data in each direction as the traffic is TDD. The circuit shown taps the signal to feed the RFIC 224 being passed. The circuit 1000 may be implemented within a strand mount device 220 (FIG. 12).

With respect to downlink signals, the circuit 1000 shows a first triplexer 910 providing downstream IF data to a first circulator 1004, a downstream control signal to a second circulator 1006, and a downstream Reference (Ref) signal to a downstream amplifier 1008. Corresponding amplifiers 1008 amplify the corresponding downstream IF data output from the first circulator 1004, the corresponding downstream control signal output from the second circulator 1006, and the downstream Ref signal. Thereafter, a third circulator 1010 routes the amplified downstream IF data signal to a corresponding power splitter 1014 that splits and communicates the amplified downstream IF data signal to the local RFIC 224 and a second triplexer 1020. Similarly, a fourth circulator 1012 routes the amplified downstream control signal to a corresponding power splitter 1016 that splits and communicates the amplified downstream control signal to the local RFIC 224 and the second triplexer 920. A corresponding power splitter 1018 splits and communicates the amplified downstream Ref signal to the local RFIC 224 and the second triplexer 1020.

With respect to uplink signals, the circuit 1000 shows the second triplexer 1020 providing each of an upstream IF data, an upstream control signal, and an upstream Ref signal to a corresponding power splitter 1014, 1016, 1018. The power splitter 1014 splits and communicates the upstream IF data to the local RFIC 224 and to the third circulator 1010, and the power splitter 1016 splits and communicates the control signal to the local RFIC 224 and to the fourth circulator 1012. On the other hand, the power splitter 1018 splits and communicates the upstream Ref signal to the local RFIC 224 and to the corresponding amplifier 1008, whereby the amplifier 1008 amplifies the upstream Ref signal and provides the amplified Ref signal to the first triplexer 910. Corresponding amplifiers 1008 amplify the corresponding upstream IF data output from the third circulator 1010 and the corresponding upstream control signal output from the fourth circulator 1012. Thereafter, the first circulator 1004 routes the amplified upstream IF data to the first triplexer 1002 and the second circulator 1006 routes the amplified upstream control signal to the first triplexer 1002.

The quasi-wireless edge network 200 provides extremely low power consumption, because each strand mount device 220 only has the low power inline amplifiers along with an RFIC and does not include larger power consumption tasks, such as network processing and/or packet routing. Moreover, the Sommerfeld-Goubau line hardware (strand mount device 220) does not get involved in any decoding processes. Any channel impairments on the power-line are additive to the impairments of the air interface. The 802.11ad standard allows for an OFDM PHY (Orthogonal Frequency-division-multiplexing physical layer), which is ideal to overcome any possible impairments on the power-line, although a single carrier system should also be compatible.

Network Device

Figure 11:
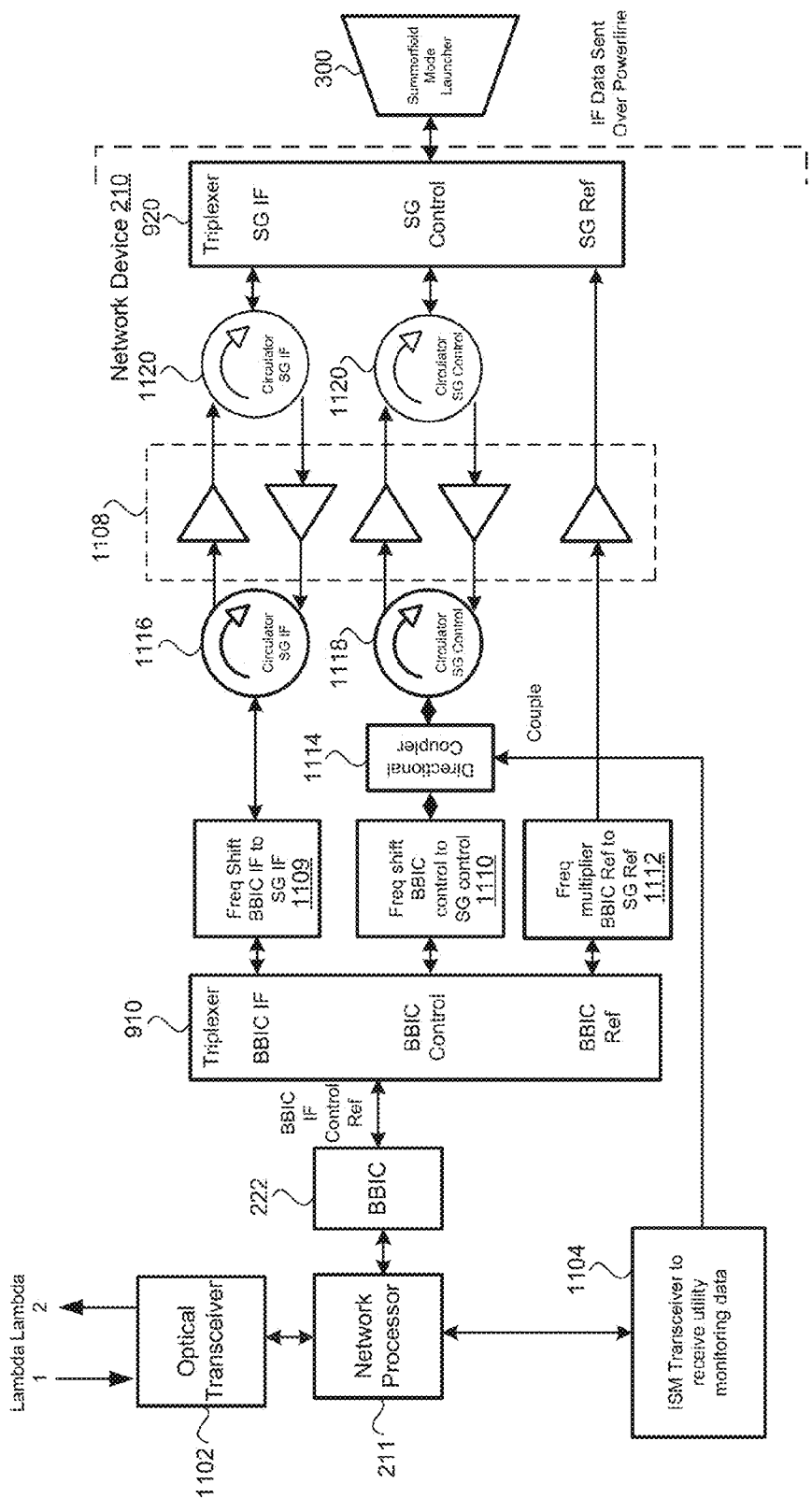
FIG. 11 is a schematic view of an example circuit of a network device.

FIG. 11 is a block diagram of an example network device 210 that is mounted at the end of the street, and which terminates the fiber 20, 22 from the OLT 50 and includes the BBIC along with necessary frequency conversion hardware. In other words, the network device 210 terminates the optical fiber from the OLT 50 and feeds IF data and control signals onto the power-line 204. In the example shown, the network device 210 includes an optical transceiver 1102 configured to receive downstream optical signals (e.g., Lambda 1) from the OLT 50 (via the remote node 70) and transmit upstream optical signals (e.g., Lambda 2) from the network device 210 to the OLT 50 (via the remote node 70). The network processor 211 is in communication with the associated BBIC 222 and an ISM transceiver 1104 configured to receive utility monitoring data and provide the utility monitoring data to the network processor 211 and a directional coupler 1114 associated with the frequency shifts of the control signal.

The BBIC 222 may provide upstream IF data, control, and ref signals to the network processor 211 and downstream IF data, control, and ref signals to the first triplexer 910. The network device 210 implements frequency shifts/multiplications via the first and second triplexers 910, 920. For example, block 1109 of the network device 210 shifts a BBIC intermediate frequency (IF) (e.g., an intermediate frequency carrying communication data) to a Sommerfeld-Goubau (SG) IF; block 1110 of the network device 210 shifts a BBIC control frequency (e.g., a frequency that identifies the destination of the communication data, i.e., which end user, code book etc.) to a SG control frequency; and block 1112 multiplies a BBIC reference frequency (e.g., local oscillator reference signal) to a SG reference frequency.

A first circulator 1116 routes the SG IF output from block 1109 to a corresponding amplifier 1108 for amplification, and a second circulator 1118 routes the SG control frequency to a corresponding amplifier 1108 for amplification, and a corresponding amplifier 1108 amplifies the SG reference frequencies and communicates the amplified SG reference frequency to the second triplexer 920. Thereafter, a third circulator 1120 routes the amplified SG IF to the second triplexer 920 and a fourth circulator 1012 routes the amplified SG control signal to the second triplexer 920. The second triplexer 920 provides the SG IF, SG control, and SG reference signals to the SG launcher 300 via the power line 204

Strand Mount Device

FIG. 12 is a block diagram of an example strand mount device 220. As previously explained with reference to FIGS. 2A and 2B, multiple strand mount devices 220 may be mounted on a power line 204 connected to the network device 210. Each strand mount device 220 is positioned in a way that allows for near line-of-sight with a house 32 of a user 30. In some implementations, the strand mount device 220 receives the SG IF, SG control, and SG reference signals from the SG launcher 300 via the power line 204. The circuit 1000 may amplify and power split the SG IF, SG control, and SG reference signals for communication to a downstream SG launcher 300 via the power line 204.

Additionally, the circuit 1000 may provide the SG IF, SG control, and SG reference signals split by the power splitters of the circuit to a triplexer 1205 associated with the local RFIC 224. In some implementations, the strand mount device 220 implements frequency shifts/divisions via the first triplexer 1002 associated with the circuit 1000 and the triplexer 1205 associated with the local RFIC 224. For instance, block 1202 of the strand mount device 220 shifts the SG IF (e.g., the intermediate frequency carrying communication data) to a BBIC IF; block 1204 of the strand mount device 220 shifts the SG control frequency (frequency identifying the destination of the communication data, i.e., which end user, code book etc.) to a BBIC control frequency; and block 1206 divides the SG reference frequency to the BBIC reference frequency. This shift allows the RFIC 224 to broadcast the signals over the mm-wave spectrum to the client device(s) 250. Thereafter, the triplexer 920 provides the BBIC IF, BBIC control, and BBIC reference signals to the local RFIC 224 and the RFIC 224 wirelessly broadcasts the signals over a RF communication link 226 to a client device 250 or another stand mount device 220.

The strand mount device 220 may further include a current transformer 700 (FIGS. 7A and 7B) and/or an energy harvesting device 1212 electrically connected to the local RFIC 224 and configured to inductively tap power from the power line 204 and supply 1216 the tapped power to the RFIC 224. In some examples, the power supply 1216 provides the tapped power to a battery backup device 1218 configured to store power for use by the RFIC 224 and/or amplifiers 1008 associated with the circuit 1000. The strand mount device 220 may include utility monitoring hardware 1214 in communication with the current transformer 700 and/or the energy harvesting device 1212. The utility monitoring hardware 1214 is configured to receive a power signal from the current transformer 700 or the energy harvester 1212 and transmit utility monitoring data via a transceiver 1220 to a network operations center (NOC) in communication with the strand mount device 220 (e.g., to notify the NOC of any issues with the power line 204.

User Receiving Device

Figure 13:
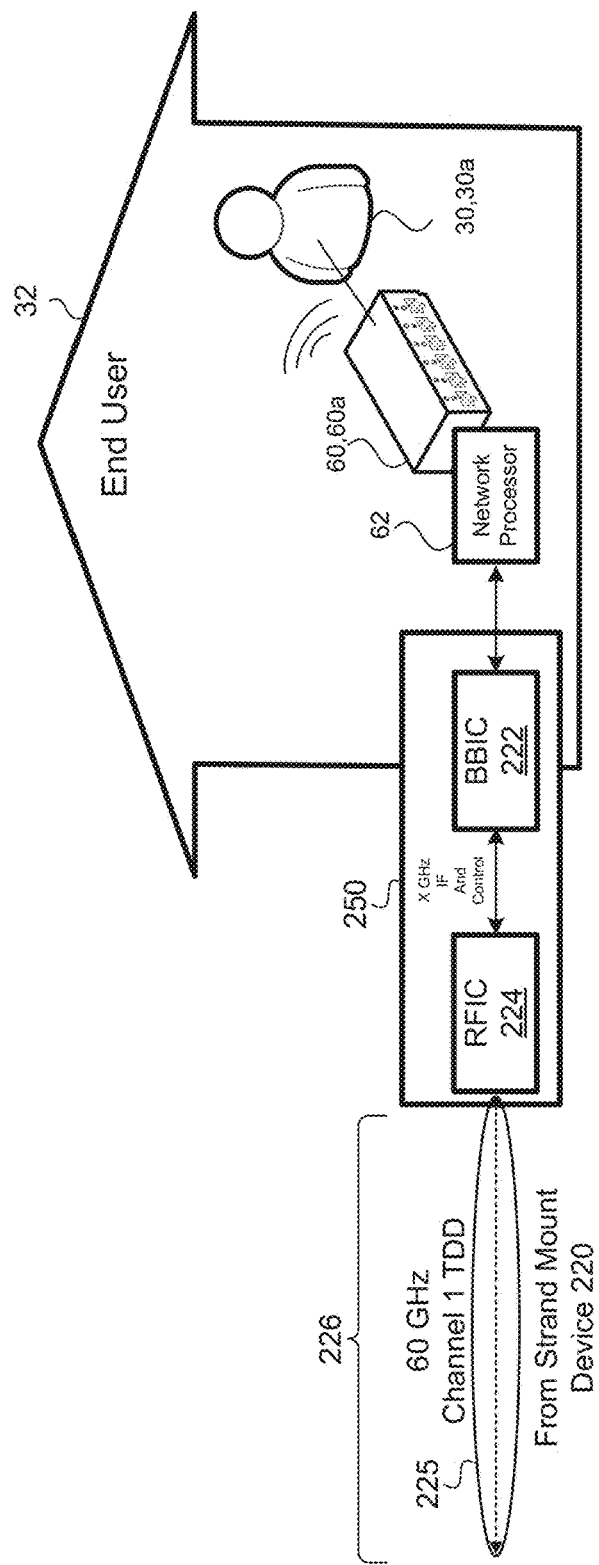
FIG. 13 is a schematic view of an example circuit of a user device receiving a signal from the strand mount device.

FIG. 13 illustrates a user receiving device 250 that includes a standard 802.11ad device 250, which includes multiple RFICs so that the antenna gain and transmit Effective Isotropic Radiated Power (EIRP) allows the link 226 to close to the strand mount device 220. The client device 250 includes a BBIC 222 in communication with the ONU 60, 60a (e.g., bi-directional transceiver) associated with a premises 32 of an end user 30, 30a. In some examples, the ONU 60 implements a network processor 62 for monitoring network parameters of the quasi-wireless edge network 200 that replaces the last section of access fiber and the fiber drop reaching the ONU 60.

Alternative Implementation

Figure 14:
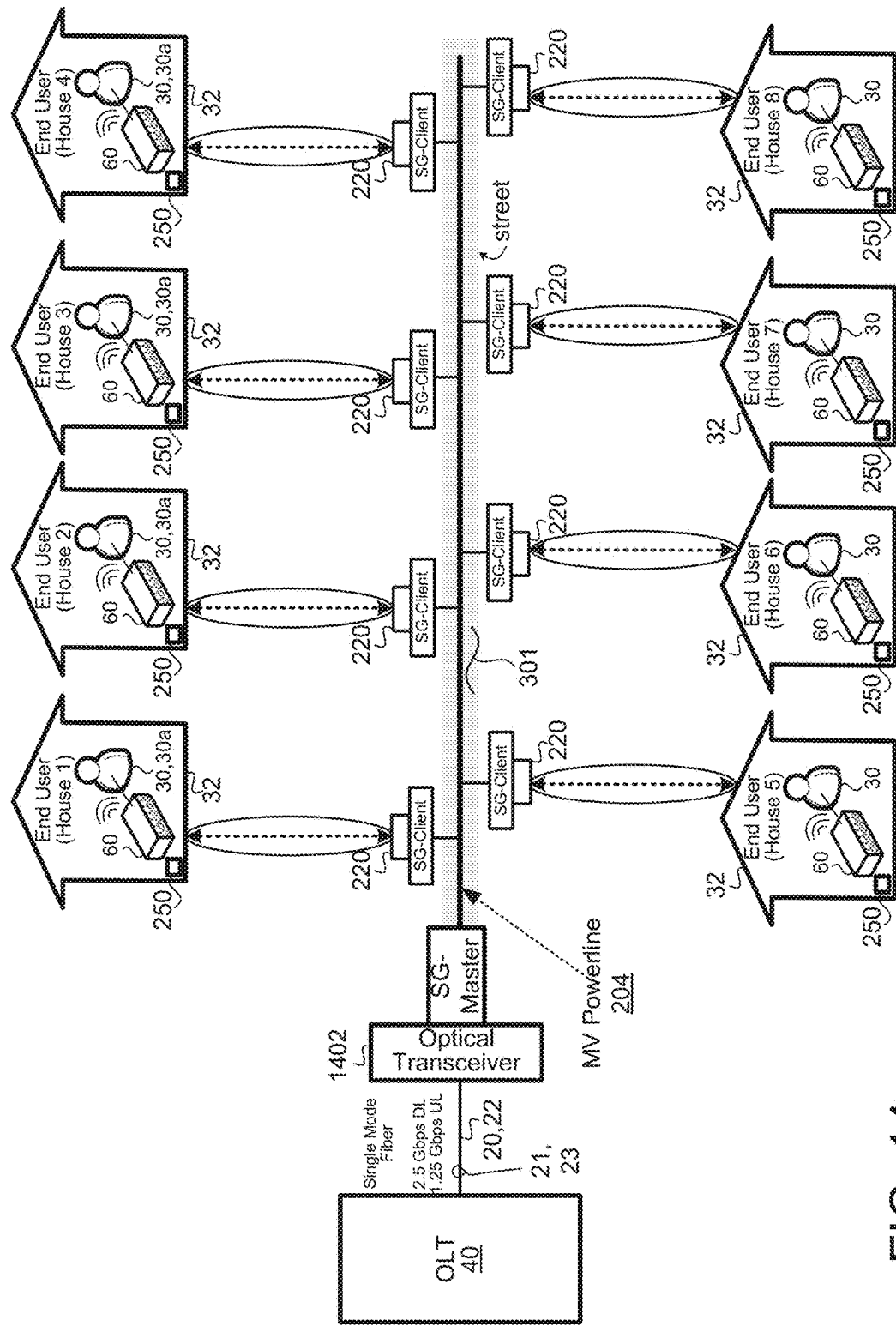
FIG. 14 is a schematic view of an example network using a point-to-multipoint wireline transceiver for a power line.

Referring to FIG. 14, in an alternative implementation, a custom point-to-multipoint wireline transceiver 1402 is in communication with the MV power line 204 and the OLT 50 and utilizes the allowed frequencies (avoiding NTIA masked frequencies). To reduce the power consumption of such a system, the transceiver 1402 could be designed such that it is a PHY replacement for the wireless links. This would allow the strand mount devices 220 to avoid having to traverse the network stack reducing power consumption. In the example shown, the strand mount devices 220 are disposed on the MV power line 204 and the in-house user devices 250 in wireless communication with the strand mount devices 220. Each client device 250 provides wireless communications from the strand mount devices 220 to a corresponding ONU 60 associated with the corresponding premises 32 of the corresponding end user 30.

Alternative Use Case

Figure 15:
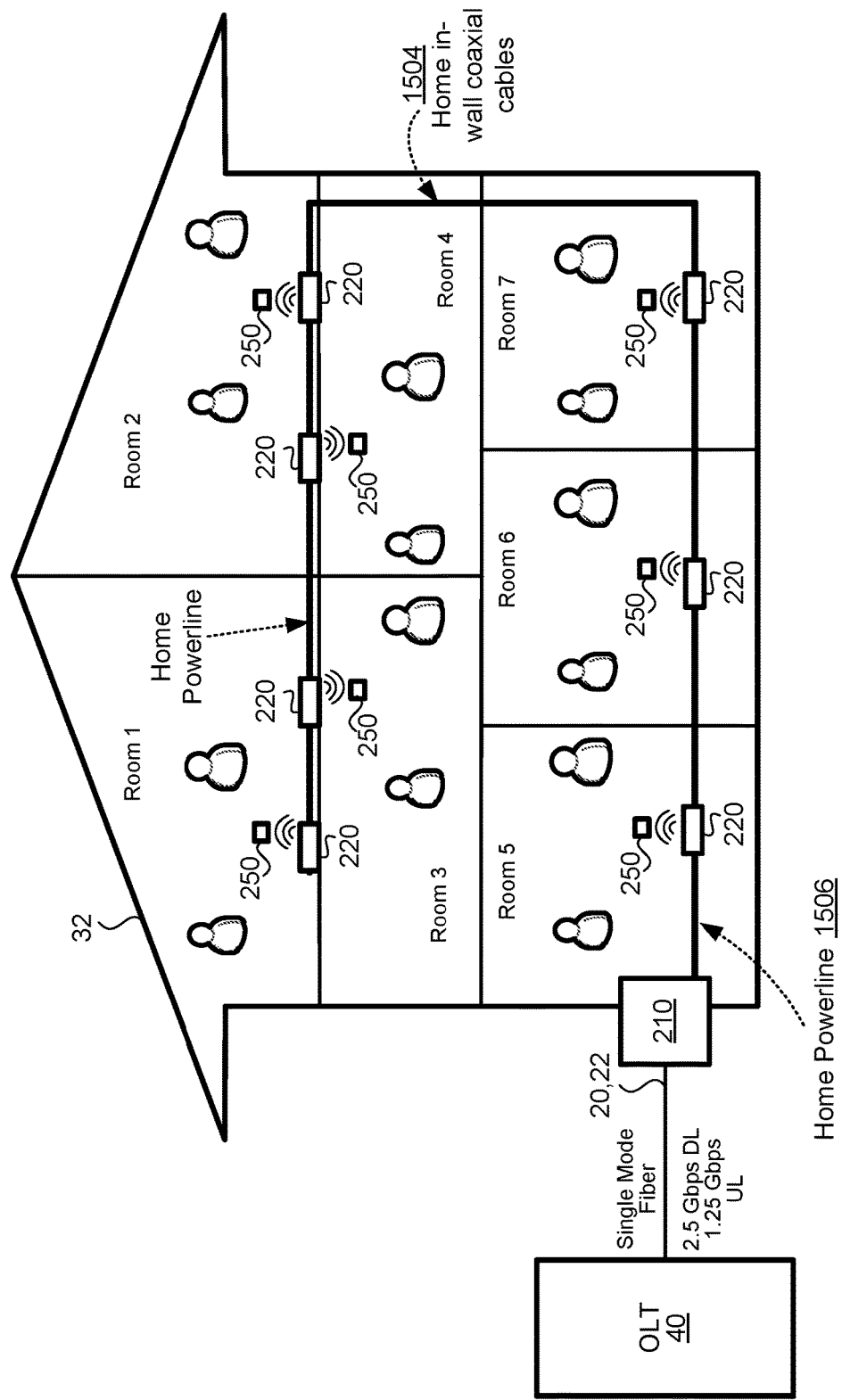
FIG. 15 is a schematic view of an example communication network used in a home.

The 802.11ad standard was conceived primarily as a connectivity solution for consumer data consumption within the home. A challenge of the 802.11ad frequency used is the need for line of sight between the access point and the connected device. This is a challenge since in a home the access point is often in a corner of a house while the devices may be in any room. Referring to FIG. 15, an alternative use for the quasi-wireless edge network 200 is within a house 32. In-home coaxial cables 1504 may be used in place of the Goubau launchers and medium voltage power lines 1506 for the purpose of distributing remote 802.11ad access point radio heads in various rooms across the house. As the frequencies of the IF traffic, control signals and Ref can be moved to frequencies not used by MOCA, DOCSIS or standard cable television transmission, it may be possible to share the coaxial cables using diplexers to combine the signals. 802.11ad multi gigabit RFICs can in this way be placed around the home allowing high speed connections to devices in multiple rooms.

Figure 16:
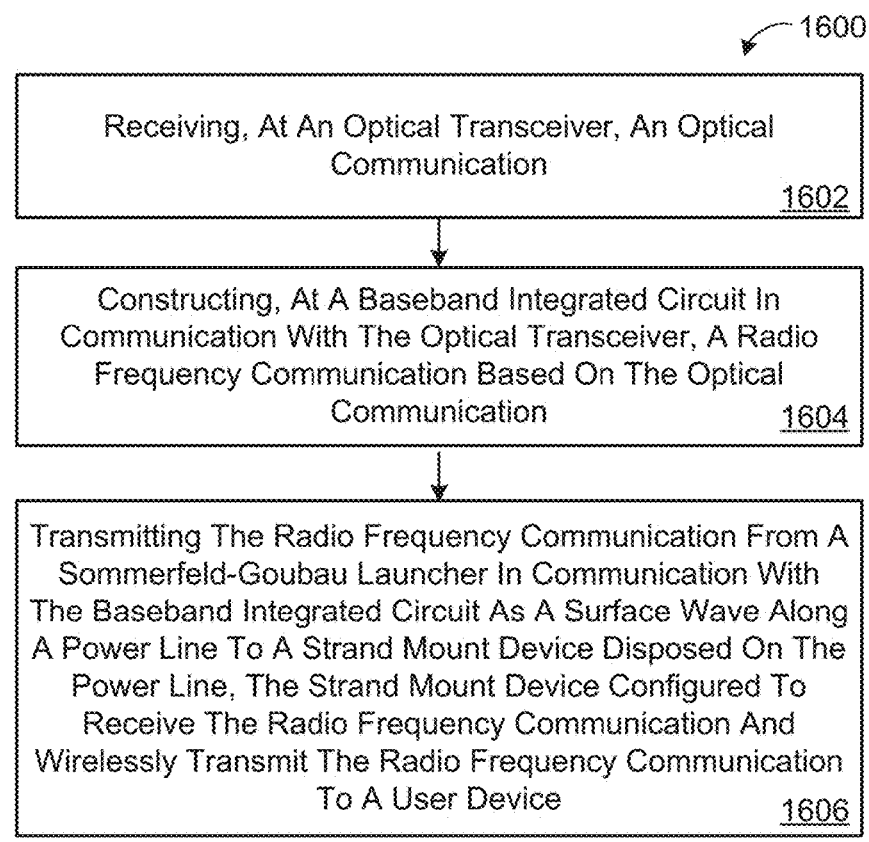
FIG. 16 is a schematic view of an example arrangement of operations for a method of delivering a communication signal.

FIG. 16 illustrates a method 1600 for delivering a communication signal. At block 1602, the method 1600 includes receiving, at an optical transceiver 1102 and an optical communication 23. At block 1604, the method 1600 includes constructing, at a baseband integrated circuit 222 in communication with the optical transceiver 1102, a radio frequency communication 225 (e.g., the intermediate frequency data and control signals) based on the optical communication 23. At block 1606, the method 1600 also includes transmitting the radio frequency communication 225 from a Sommerfeld-Goubau launcher 300, 300a in communication with the baseband integrated circuit 222 as a surface wave 301 along a power line 204 to a strand mount device 220 disposed on the power line 204. The strand mount device 220 is configured to receive the radio frequency communication 225 and wirelessly transmit the radio frequency communication 225 (e.g., via a wireless link) to a user device 250.

In some implementations, the method 1600 includes processing the optical communication 23 at a network processor 211 in communication with the optical transceiver 1102 and the baseband integrated circuit 222. The step of constructing the radio frequency communication 225 may include constructing intermediate frequency data for a wireless link 226 and control signals for controlling at least one radio frequency integrated circuit 224 of the strand mount device 220. In some implementations, transmitting the radio frequency communication 225 as the surface wave 301 along the power line 204 to the strand mount device 220 includes transmitting the radio frequency communication 225 from the Sommerfeld-Goubau launcher 300, 300a to a Sommerfeld-Goubau catcher 300, 300b of the strand mount device 220. The Sommerfeld-Goubau launcher 300, 300a and the Sommerfeld-Goubau catcher 300, 300b may include a frustoconical shell 310 defining a longitudinal axis 302 and first and second openings 312, 314 along the longitudinal axis 302. The first opening 312 may be smaller than the second opening 314, wherein the power line 204 passes through the first opening 312 and the second opening 314 and along the longitudinal axis 302, the first opening 312 is coupled to the power line 204. The power line 204 may include a single conductor 304 acting as a Sommerfeld-Goubau line for conveyance of the surface wave 301. The strand mount device 220 may be configured to wirelessly transmit the radio frequency communication 225 in accordance with an IEEE 802.11ad protocol to the user device 250. The user device 250 may be located within a near line-of-sight of the strand mount device 220.

Figure 17:
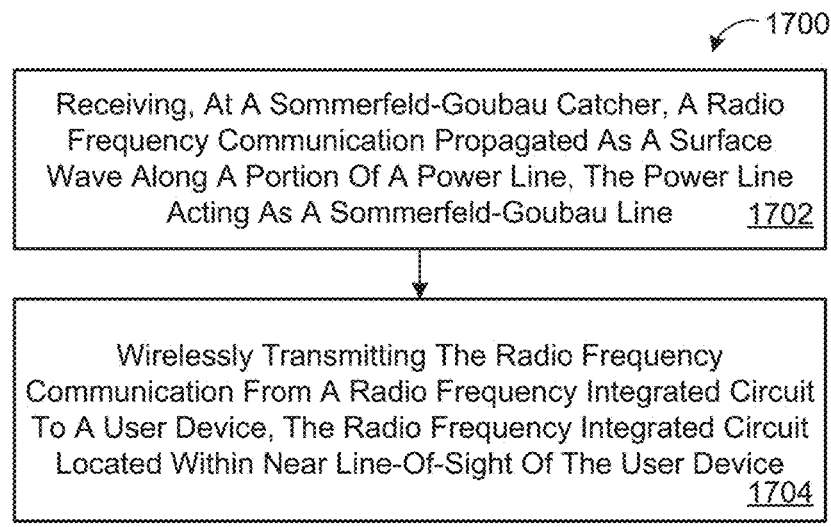
FIG. 17 is a schematic view of an example arrangement of operations for a method of operating an antenna distribution system.

FIG. 17 illustrates a second method 1700 for operating an antenna distribution system. At block 1702, the method 1700 includes receiving, at a Sommerfeld-Goubau catcher 300, 300b, a radio frequency communication 225 (e.g., an intermediate frequency communication) propagated as a surface wave 301 along a portion of a power line 204 and wirelessly transmitting the radio frequency communication 225 from a radio frequency integrated circuit 224 to a user device 250. The power line 204 acts as a Sommerfeld-Goubau line 300, 300a, 300b. The radio frequency integrated circuit 224 is located within near line-of-sight of the user device 250.

The method 1700 may include transmitting the radio frequency communication 225 from a Sommerfeld-Goubau launcher 300, 300a as the surface wave 301 along another portion of the power line 204. The radio frequency integrated circuit 224 may be configured to transmit the radio frequency communication 225 in accordance with an IEEE 802.11ad protocol.

In some examples, the Sommerfeld-Goubau launcher 300, 300a and the Sommerfeld-Goubau catcher 300, 300b each include a substantially frustoconical shell 310 defining a longitudinal axis 302 and first and second openings 312, 314 along its longitudinal axis 302. In these examples, the first opening 312 is smaller than the second opening 314 and the power line 204 passes through the first opening 312 and the second opening 314 along the longitudinal axis 302, with the first opening 312 coupled to the power line 204. Additionally, the power line 204 may include a single conductor acting as the Sommerfeld-Goubau line 300, 300a, 300b for conveyance of the surface wave 301.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at an optical transceiver, an optical communication;
   constructing, at a baseband integrated circuit in communication with the optical transceiver, a radio frequency communication based on the optical communication;
   transmitting the radio frequency communication from a Sommerfeld-Goubau launcher in communication with the baseband integrated circuit as a surface wave along a power line to a strand mount device disposed on the power line, the strand mount device configured to receive the radio frequency communication and wirelessly transmit the radio frequency communication to a user device;
   inductively tapping power, by an energy harvesting device, from the power line, the energy harvesting device electrically connected to the baseband integrated circuit; and
   supplying, by the energy harvesting device, the tapped power to the baseband integrated circuit.

2. The method of claim 1, further comprising processing the optical communication at a network processor in communication with the optical transceiver and the baseband integrated circuit.

3. The method of claim 1, wherein constructing the radio frequency communication comprises constructing intermediate frequency data for a wireless link and control signals for controlling at least one radio frequency integrated circuit of the strand mount device.

4. The method of claim 1, wherein transmitting the radio frequency communication as the surface wave along the power line to the strand mount device comprises transmitting the radio frequency communication from the Sommerfeld-Goubau launcher to a Sommerfeld-Goubau catcher of the strand mount device.

5. The method of claim 4, the Sommerfeld-Goubau launcher and the Sommerfeld-Goubau catcher each comprise:
   a substantially frustoconical shell defining a longitudinal axis and first and second openings along the longitudinal axis, the first opening smaller than the second opening,
   wherein the power line passes through the first opening and the second opening and along the longitudinal axis, the first opening coupled to the power line.

6. The method of claim 5, wherein the power line comprises a single conductor acting as a Sommerfeld-Goubau line for conveyance of the surface wave.

7. The method of claim 1, wherein the strand mount device is configured wirelessly transmit the radio frequency communication in accordance with an IEEE 802.11ad protocol to the user device, the user device located within near line-of-sight of the strand mount device.

8. A strand mount device comprising:
   a Sommerfeld-Goubau catcher configured to attach to a power line and to receive a radio frequency communication propagated as a surface wave along a first portion of the power line;
   a Sommerfeld-Goubau launcher configured to attach to the power line and to transmit the received radio frequency communication as the surface wave along a second portion of the power line;

at least one radio frequency integrated circuit in communication with the Sommerfeld-Goubau catcher and the Sommerfeld-Goubau launcher, the at least one radio frequency integrated circuit configured to receive the radio frequency communication and wirelessly transmit the radio frequency communication to a user device; and an energy harvesting device electrically connected to the at least one radio frequency integrated circuit and configured to inductively tap power from the power line and supply the tapped power to the at least one radio frequency integrated circuit.

9. The strand mount device of claim 8, wherein the radio frequency communication comprises intermediate frequency data for a wireless link and control signals for controlling the at least one radio frequency integrated circuit.

10. The strand mount device of claim 8, further comprising a housing configured to mount on the power line and house the Sommerfeld-Goubau catcher, the Sommerfeld-Goubau launcher, and the at least one radio frequency integrated circuit.

11. The strand mount device of claim 8, further comprising an amplifier in communication with the Sommerfeld-Goubau launcher and configured to amplify the radio frequency communication.

12. The strand mount device of claim 8, further comprising a frequency shifter in communication with the Sommerfeld-Goubau launcher, the frequency shifter configured to shift a frequency of the received radio frequency wave to satisfy a passband frequency of the Sommerfeld-Goubau launcher.

13. The strand mount device of claim 8, further comprising utility monitoring hardware electrically connected to the energy harvesting device, the utility monitoring hardware configured to receive a power signal from the energy harvesting device and transmit utility monitoring data to a network operations center in communication with the strand mount device.

14. A network node comprising:
an optical transceiver configured to receive an optical communication;
a baseband integrated circuit in communication with the optical transceiver and configured to construct a radio frequency communication based on the optical communication;
a Sommerfeld-Goubau launcher in communication with the baseband integrated circuit and configured to couple to a power line, the Sommerfeld-Goubau launcher configured to propagate the radio frequency communication as a surface wave along the power line; and
an energy harvesting device electrically connected to the baseband integrated circuit and configured to inductively tap power from the power line and supply the tapped power to the baseband integrated circuit.

15. The network node of claim 14, wherein the radio frequency communication comprises intermediate frequency data for a wireless link and control signals for controlling the at least one radio frequency integrated circuit.

16. The network node of claim 14, further comprising a network processor in communication with the optical transceiver and the baseband integrated circuit, the network processor configured to process the optical communication.

17. The network node of claim 14, wherein the Sommerfeld-Goubau launcher comprises:
a frustoconical shell defining a longitudinal axis and first and second openings along the longitudinal axis, the first opening smaller than the second opening,
wherein the power line passes through the first opening and the second opening and along the longitudinal axis, the first opening configured to be coupled to the power line.

18. The network node of claim 14, wherein the baseband integrated circuit is configured to manage communication of the radio frequency communication.

19. The network node of claim 14, further comprising a housing configured to attach to a power line and house the baseband integrated circuit and the Sommerfeld-Goubau launcher.

20. A method comprising:
receiving at a Sommerfeld-Goubau catcher a radio frequency communication propagated as a surface wave along a portion of a power line, the power line acting as a Sommerfeld-Goubau line;
wirelessly transmitting the radio frequency communication from a radio frequency integrated circuit to a user device, the radio frequency integrated circuit located within near line-of-sight of the user device;
inductively tapping power, by an energy harvesting device, from the power line, the energy harvesting device electrically connected to the radio frequency integrated circuit; and
supplying, by the energy harvesting device, the tapped power to the radio frequency integrated circuit.

21. The method of claim 20, further comprising transmitting the radio frequency communication from a Sommerfeld-Goubau launcher as the surface wave along another portion of the power line.

22. The method of claim 21, wherein the Sommerfeld-Goubau launcher and the Sommerfeld-Goubau catcher each comprise:
a substantially frustoconical shell defining a longitudinal axis and first and second openings along the longitudinal axis, the first opening smaller than the second opening,
wherein the power line passes through the first opening and the second opening and along the longitudinal axis, the first opening coupled to the power line.

23. The method of claim 20, wherein the power line comprises a single conductor acting as the Sommerfeld-Goubau line for conveyance of the surface wave.

24. The method of claim 20, wherein the radio frequency integrated circuit is configured to transmit the radio frequency communication in accordance with an IEEE 802.11ad protocol.

* * * * *